(12) United States Patent
Amimori et al.

(10) Patent No.: US 6,559,915 B1
(45) Date of Patent: May 6, 2003

(54) OPTICAL FILMS HAVING MATT PROPERTY, FILMS HAVING A HIGH TRANSMITTANCE, POLARIZING PLATES AND LIQUID CRYSTAL DISPLAY DEVICES

(75) Inventors: Ichiro Amimori, Minami-ashigara (JP); Hidetoshi Watanabe, Minami-ashigara (JP); Jun Watanabe, Minami-ashigara (JP); Hiroshi Inoue, Minami-ashigara (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 251 days.

(21) Appl. No.: 09/618,804

(22) Filed: Jul. 18, 2000

(30) Foreign Application Priority Data

Jul. 19, 1999 (JP) .............................. 11-205351
Sep. 30, 1999 (JP) .............................. 11-315746

(51) Int. Cl.⁷ ..................... G02F 1/1335; G02F 1/1333
(52) U.S. Cl. ........................ 349/112; 349/96; 349/113; 349/160
(58) Field of Search ................. 349/113, 160, 349/96, 112; 428/1.1

(56) References Cited

U.S. PATENT DOCUMENTS 5,583,679 A    12/1996    Ito et al. ..................... 349/118

FOREIGN PATENT DOCUMENTS

JP        8-50206        2/1996
JP        10-240143      9/1998

*Primary Examiner*—Harold Pyon
*Assistant Examiner*—Patricia L. Nordmeyer
(74) *Attorney, Agent, or Firm*—Burns, Doane, Swecker & Mathis, LLP

(57) ABSTRACT

The present invention relates to an optical film having matt property and a matted film having a high transmittance which can be used for producing polarizing plates or liquid crystal display device excellent in display brightness and display quality by using the aforesaid films adjusted in a specific surface roughness or by using a specific two kinds of fine particles in a hard coat layer of the films. The present invention relates also to a polarizing plate of a high transmittance having an optical compensative capacity and matt property. A liquid crystal display device and a color liquid crystal display device using the aforesaid polarizing plate possessing an excellent viewing angle characteristics and is improved in Newton ring caused by contact with a light-tuning film and in non-uniformity in brightness due to the light-tuning film.

15 Claims, 6 Drawing Sheets

OPTICAL FILMS HAVING MATT PROPERTY, FILMS HAVING A HIGH TRANSMITTANCE, POLARIZING PLATES AND LIQUID CRYSTAL DISPLAY DEVICES

FIELD OF THE INVENTION

The present invention relates to an optical film possessing matt property, a film having a high transmittance, a polarizing plate using the films and a liquid crystal display device using these elements.

The present invention relates also to a polarizing plate of a high transmittance possessing matt property and an optical compensative capacity and a liquid crystal display device and a color liquid crystal display device.

BACKGROUND OF THE INVENTION

The construction of a liquid crystal display device in conventional art is shown in FIG. 1. An ordinary liquid crystal display device is comprised of a backlight 11 of an edge light type on the furthest back surface and, in the order from the furthest back surface, a light introductive plate 12 for injecting light from the back light toward the surface, a scattering sheet 13 for uniformly dispersing brightness of the light, and one or plural light-tuning sheet (light tuning film) 14 having a function for condensing the uniformly dispersed light by the scattering sheet to a given direction or alternatively a function for selectively transmitting or reflecting a specific polarized light. Light passing through these films is injected to a liquid crystal cell 17 interposed between a pair of polarizing plates 15 (backside polarizing plate) and 16 (surface polarizing plate). The polarizing plate is comprised usually of three layers of a polarizing layer (polarizer) interposed by 2 sheets of a protecting film. In the figure, 18 denotes a cooled cathode fluorescent tube as light source and 19 a reflective sheet.

The light tuning film 14 and the backside polarizing plate 15 located on the side of the liquid crystal cell are especially not bonded with a binder or the like so that a slight gap exists between both. This light tuning film 14 is made of an acrylic resin, a polyester, a polycarbonate or the like, but these materials are rather larger in stretching or shrinking caused by change in temperature so that the light tuning film elongated by heating due to ambient circumstance, backlight or the like is brought into contact with the backside polarizing plate 15 to cause non-uniformity in display in circumferential areas of image. In some of the light tuning films, there exists a unique brightness non-uniformity, thus bringing about deterioration in their display quality.

JP-A ("JP-A" means unexamined published Japanese patent application) No. Hei. 10-240143 discloses that non-uniformity in display due to contact can be improved by imparting matt property forming concavo-convex pattern onto the surface. However, control of the concave-convex pattern was not as yet controlled so that a satisfactory improved effect has not been obtained. Moreover, the transmission rate of backlight is decreased in this method due to scattering of the concave-convex surface to incur lowering of brightness for display. As for non-uniformity in brightness of the light tuning film, the use of one more scattering film is thinkable between the light tuning film and the liquid crystal cell. As the scattering film generally has haze, the transmittance will be decreased to lower display brightness as in case of imparting matt property.

In case the matt property is imparted to a film, it is general that a hard coat layer is incorporated with particles of matt property to exhibit the matt property. This hard coat layer is also provided with a function to improve scratch-resisting property so that the hard coat layer is generally made of a rigid material such as a crosslinked binder polymer. Usually, a binder polymer is allowed to crosslink after it has formed a hard coat layer. For this, however, the binder polymer may be shrunk in the course of crosslinking reaction to permit the formation of crack in the hard coat layer. Further, as the hard coat layer shrinks as a whole, a film per se provided with the hard coat layer may undergo deformation (the generation of curl, etc.). In case such film is used as the aforesaid light tuning film, defect or strain is formed to deteriorate display quality.

In view of the foregoing, a liquid crystal display device employing a conventional optical film of matt property failed to be satisfactory in display brightness and display quality.

The display type of LCD can roughly be classified into a birefringence mode and an optical rotation mode. A super twisted nematic liquid crystal display device utilizing the birefringence mode (referred to hereinafter as STN-LCD) employs super twisted nematic liquid crystal possessing a twisted angle exceeding 90° and steep electrooptical characteristics. Therefore, STN-LCD enables display of a large capacity due to multiplex drive. However, STN-LCD has problems such as a slow response (several hundred milliseconds) and difficulty in grade display, and is inferior as compared with a liquid crystal display characteristics using active device (such as TFT-LCD and MIM-LCD).

In TFT-LCD and MIM-LCD, a twisted nematic liquid crystal possessing a twisted angle of 90° and a positive birefringence is used for displaying images. These are a display mode of TN-LCD which is an optical rotation mode. As this mode obtains a high responsibility (several ten milliseconds) and a high contrast, this mode is advantageous in many aspects as compared with the birefringence mode. Since TN-LCD changes display colors and display contrast according to a viewing angle of looking at the liquid crystal display device (viewing angle characteristics), it involves a problem that the device is difficult in watching as compared with CRT.

JP-A Nos. Hei. 4-229828 and Hei. 4-258923 disclose a proposal of providing a phase differential plate (optical compensative sheet) between a liquid crystal cell and a pair of polarizing plate for improving viewing angle characteristics. As the phase differential plate proposed in the aforesaid publications is a phase difference is almost 0 in the vertical direction to the liquid crystal cell, it gives no optical effect on direct front but a phase difference is realized when is tilted. A phase difference generated in an inclined direction is thereby compensated. A sheet having a negative birefringence so as to compensate a positive birefringence of a nematic liquid crystal and having an inclined optic axis is effective for such optical compensative sheet.

JP-A No. Hei. 6-75115 and EP 576304A1 disclose an optical compensative sheet having a negative birefringence and an inclined optic axis. This sheet is manufactured by stretching a polymer such as polycarbonate or polyester and has a main refractive index direction inclined to the normal line thereof. As such sheet requires an extremely complicate stretching treatment, however, it is extremely difficult to manufacture a uniform optical compensative sheet of a large area stably according to this method.

On the other hand, JP-A Nos. Hei. 3-9326 and 3-291601 disclose a method using a liquid crystalline polymer. An optical compensative sheet is thereby obtained by applying a liquid crystalline polymer onto the surface of an alignment (oriented) layer of a support. As the liquid crystalline polymer fails to show a satisfactory direction on the alignment layer, however, it is impossible to enlarge the viewing angle in all directions. JP-A No. 5-215921 discloses an optical compensative sheet (birefringent plate) comprises a support and a liquid crystalline polymeric bar-type compound having a positive birefringence. This optical compensative sheet is obtained by applying a solution of the polymeric bar-type compound onto the support and curing the compound under heating. However, the liquid crystalline polymer is devoid of birefringence so that it is unable to enlarge the viewing angle in all directions.

In JP-A No. Hei. 8-50206, there is disclosed an optical compensative sheet characterized by a layer of a negative birefringence comprised of a compound having a discotic structure unit wherein an angle between the discotic compound and a support is changed in the direction of the depth of the layer. According to the method described therein, a viewing angle viewed from contrast is extensively enlarged in all directions and deterioration of images such as yellowing viewed from an incline direction is scarcely observed. With the optical compensative sheet alone, however, a Newton ring caused by contact with the light tuning film and a non-uniformity in brightness caused by the light tuning film cannot be improved. Thus, further improvement is required.

SUMMARY OF THE INVENTION

It is an object of the present invention to provide an optical film of matt property and a film having a high transmittance and matt property capable of preventing deterioration of display grade (non-uniformity of display or brightness, etc.) without causing lowering of display brightness, and a polarizing plate (a deflecting plate) of matt property as well as a liquid crystal display device using the film.

It is another object of the present invention to provide a deflecting plate of matt property improved in the degree of lowering display brightness due to scattering and lowering of display quality due to contact and scratch as well as a liquid crystal display device.

It is still another object of the present invention to provide a liquid crystal display device possessing excellent display quality in all directions by enlarging a viewing angle of a liquid crystal display device and a color liquid crystal display device of TN mode wherein a Newton ring caused by contact with a light tuning film and non-uniformity of brightness due to the light tuning film are improved and also to provide these display devices manufactured at an economic price stably in a simple manner.

The objects of the present invention have been achieved according to the following means:

(1) An optical film having matt property utilizable for an optical film on a backlight side of a liquid crystal cell in a liquid crystal display device, comprising a hard coat layer on a transparent support, the hard coat layer containing a crosslinked polymeric binder and transparent fine particles, and the surface roughness Ra being 0.1 to 0.3 $\mu$m and Rz being 1 to 3 $\mu$m.

(2) An optical film having matt property utilizable for an opticl film on a backlight side of a liquid crystal cell in a liquid crystal display device, comprising a hard coat layer on a transparent support, the hard coat layer containing a crosslinked polymeric binder and transparent fine particles, PC that is the number of the transparent fine particles being 20 to 200/cm.

(3) The optical film having matt property according to the aforesaid paragraph (1), wherein PC that is the number of the transparent fine particles in the hard coat layer is 20 to 200/cm.

(4) The optical film having matt property according to any one of the aforesaid paragraphs (1)~(3), wherein the transparent fine particles are organic material.

(5) The optical film having matt property according to any one of the aforesaid paragraphs (1)~(3), wherein the transparent fine particles are organic material having a Moh's hardness of less than 7.

(6) A polarizing plate having matt property comprising the optical film having matt property of any one of the aforesaid paragraphs (1)~(5) used for at least one of the two protective films of a polarizing layer thereof and a matted layer disposed at the opposite side of the polarizing layer.

(7) A film having a high transmittance and matt property utilizable for an optical film on a backlight side of a liquid crystal cell in a liquid crystal display device, comprising a transparent support, a hard coat layer and a low refractive index layer having a refractive index lower than that of the transparent support, the hard coat layer and the low refractive index layer being overlaid on the transparent support in the written order, the hard coat layer containing a crosslinked polymeric binder and transparent fine particles, and the surface roughness Ra being 0.1 to 0.3 $\mu$m and Rz being 1 to 3 $\mu$m.

(8) A film having a high transmittance and matt property utilizable for an optical film a backlight side of a liquid crystal cell in a liquid crystal display device, comprising a transparent support, a hard coat layer and a low refractive index layer having a refractive index lower than that of the transparent support, the hard coat layer and the low refractive index layer being overlaid on the transparent support in the written order, the hard coat layer containing a crosslinked polymeric binder and transparent fine particles, and PC that is the number of the transparent fine particles being 20 to 200/cm.

(9) The film having a high transmittance and matt property according to the aforesaid paragraph (7), wherein PC that is the number of the transparent fine particles in the hard coat layer is 20 to 200/cm.

(10) The film having a high transmittance and matt property according to any one of the aforesaid paragraphs (7)~(9), wherein the transparent fine particles are organic material.

(11) The film having a high transmittance and matt property according to any one of the aforesaid paragraphs (7)~(9), wherein the transparent fine particles are organic material having a Moh's hardness of less than 7.

(12) The film having a high transmittance and matt property according to any one of the aforesaid paragraphs (7)~(11), wherein the low refractive index layer contains a fluorine-containing compound capable of being crosslinked by heat or ionizing radiation and has a refractive index of 1.45 or less and a dynamic friction coefficient of 0.2 or less.

(13) A polarizing plate having a high transmittance and matt property comprising the film having a high transmittance and matt property according to any one of the aforesaid paragraphs (7)~(12) used for at least one of the two protective films of a polarizing layer thereof and a matted layer disposed at the opposite side of the polarizing layer.

(14) A liquid crystal display device which comprises the polarizing plate having matt property according to the aforesaid paragraph (6) or the polarizing plate having a high transmittance and matt property according to the aforesaid paragraph (13).

(15) An optical film having matt property comprising a hard coat layer on a transparent support, the hard coat layer containing inorganic fine particles having been treated on the surface thereof with a silane-coupling agent, a crosslinked polymeric binder, and monodisperse transparent fine particles having an average particle diameter greater than the thickness of the hard coat layer and a particle diameter distribution of 0.2 or less in terms of a variation coefficient.

(16) The optical film having matt property according to the aforesaid paragraph (15), wherein the silane-coupling agent bound onto the surface of the inorganic fine particles is chemically bonded to the crosslinked polymeric binder.

(17) The optical film having matt property according to the aforesaid paragraph (15) or (16), wherein the silane-coupling agent used for the surface treatment comprises a compound represented by the following formula (Ia), (Ib), (Ic), (Id) or (Ie):

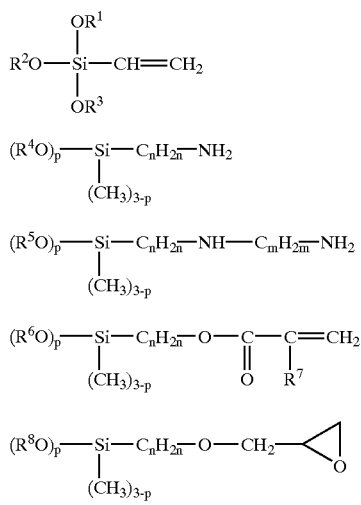

wherein $R^1$, $R^2$, $R^3$, $R^4$, $R^5$, $R^6$ and $R^8$ in the formulas (Ia), (Ib), (Ic), (Id) and (Ie) each independently stands for an alkyl group having 1 to 4 carbon atoms or an alkoxyalkyl group having 2 to 4 carbon atoms, $R^7$ stands for a hydrogen atom or an alkyl group having 1 to 4 carbon atoms, n and m each stands for 2 or 3, and p stands for 2 or 3.

(18) A polarizing plate having matt property comprising the optical film having matt property according to any one of the aforesaid paragraphs (15)~(17) used for at least one of the two protecting films of a polarizing layer thereof and a matted layer disposed at the opposite side of the polarizing layer.

(19) A liquid crystal display device using the optical film having matt property according to any one of the aforesaid paragraphs (15)~(17).

(20) A liquid crystal display device which comprises the polarizing plate according to the aforesaid paragraph (18) used as a polarizing plate on the side of backlight out of the two polarizing plates disposed on both sides of the liquid crystal cell, the polarizing plate being arranged in such manner that the matted layer is faced to the backlight side.

(21) A film having a high transmittance and matt property utilizable for an optical film comprising a transparent support, a hard coat layer and a low refractive index layer having a refractive index lower than that of the transparent support, the hard coat layer and the low refractive index layer being overlaid on the transparent support in the written order, the hard coat layer containing inorganic fine particles having been treated on the surface thereof with a silane-coupling agent, a crosslinked polymeric binder, and monodisperse transparent fine particles having an average particle diameter greater than the thickness of the hard coat layer and a particle diameter distribution of 0.2 or less in terms of a variation coefficient.

(22) The film having a high transmittance and matt property according to the aforesaid paragraph (21), wherein the silane-coupling agent bound onto the surface of the inorganic fine particles is chemically bonded to the crosslinked polymeric binder.

(23) The film having a high transmittance and matt property according to the aforesaid paragraph (21) or (22), wherein the silane-coupling agent used for the surface treatment comprises a compound represented by the following formula (Ia), (Ib), (Ic), (Id) or (Ie):

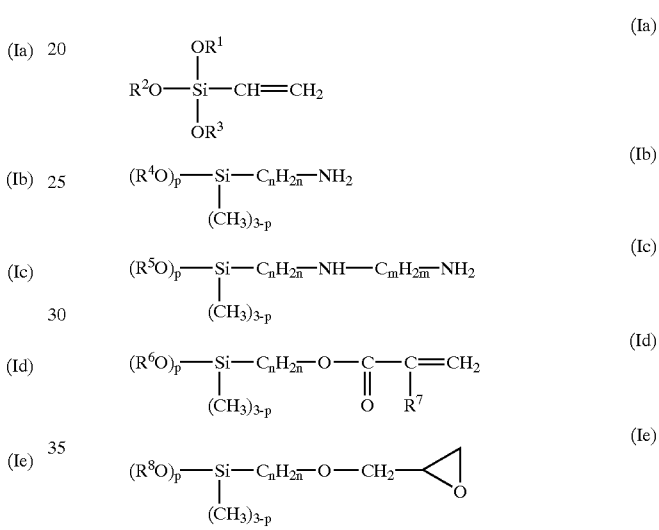

wherein $R^1$, $R^2$, $R^3$, $R^4$, $R^5$, $R^6$ and $R^8$ in the formulas (Ia), (Ib), (Ic), (Id) and (Ie) each independently stands for an alkyl group having 1 to 4 carbon atoms or an alkoxyalkyl group having 2 to 4 carbon atoms, $R^7$ stands for a hydrogen atom or an alkyl group having 1 to 4 carbon atoms, n and m each stands for 2 or 3, and p stands for 2 or 3.

(24) The film having a high transmittance and matt property according to any one of the aforesaid paragraphs (21)~(23), wherein the low refractive index layer contains a fluorine-containing compound capable of being crosslinked by heat or ionizing radiation and has a refractive index of 1.45 or less and a dynamic friction coefficient of 0.2 or less.

(25) A polarizing plate having a high transmittance and matt property comprising the film having a high transmittance and matt property according to any one of the aforesaid paragraphs (21)~(24) used for at least one of the two protective films of a polarizing layer thereof and a matted layer disposed at the opposite side of the polarizing layer.

(26) An optical film having matt property utilizable for an optical film on a backlight side of a liquid crystal cell in a liquid crystal display device, comprising a hard coat layer on a transparent support, the hard coat layer containing inorganic fine particles having been treated on the surface thereof with a silane-coupling agent, a crosslinked polymeric binder, and monodisperse transparent fine particles having an average particle diameter greater than the thickness of the hard coat layer and a particle diameter distribution of 0.2 or less in terms of a variation coefficient, and the surface roughness Ra being 0.1 to 0.3 μm and Rz being 1 to 3 μm.

(27) A film having a high transmittance and matt property utilizable for an optical film on a backlight side of a liquid crystal cell in a liquid crystal display device, comprising a transparent support, a hard coat layer and a low refractive index layer having a refractive index lower than that of the transparent support overlaid in the written order, the hard coat layer containing inorganic fine particles having been treated on the surface thereof with a silane-coupling agent, a crosslinked polymeric binder, and monodisperse transparent fine particles having an average particle diameter greater than the thickness of the hard coat layer and a particle diameter distribution of 0.2 or less in terms of a variation coefficient, and the surface roughness Ra being 0.1 to 0.3 μm and Rz being 1 to 3 μm.

(28) A liquid crystal display device using the film having a high transmittance and matt property according to any one of the aforesaid paragraphs (21)~(24).

(29) A liquid crystal display device which comprises the polarizing plate having a high transmittance and matt property according to the aforesaid paragraph (25) used as a polarizing plate on the side of backlight out of the two polarizing plates disposed on both sides of the liquid crystal cell, the polarizing plate being arranged in such manner that the matted layer is faced to the backlight side.

(30) A polarizing plate comprising a polarizing layer interposed between 2 transparent supports, an optical compensative layer containing an optical anisotropic layer on the surface of one of the transparent supports opposite to the polarizing layer, and a matted layer on the surface of the other transparent support opposite to the polarizing layer, the optical anisotropic layer comprised of a compound of a discotic structure unit and having a negative birefringence, a disk surface of the discotic structure unit being inclined to the surface of the transparent support, and an angle of the disk surface of the discotic structure unit with the surface of the transparent support being changed in the direction of depth of the optical anisotropic layer.

(31) The polarizing plate according to the aforesaid paragraph (30), wherein the angle is increased with increasing of distance between the discotic structure unit and the surface of the transparent support.

(32) The polarizing plate according to the aforesaid paragraph (30), wherein the optical anisotropic layer further contains cellulose ester.

(33) The polarizing plate according to the aforesaid paragraph (30), wherein the transparent support of the optical anisotropic layer side has an optically negative uniaxial property and an optic axis in the direction of normal line of the surface of the transparent support and satisfies the following condition:

$$20 \leq \{(nx+ny)/2-nz\} \times d \leq 400$$

wherein nx, ny, and nz stand for main refractive indices of three orthogonal axes of the transparent support, nz stands for a main refractive index in the direction of thickness of the transparent support, and d stands for a thickness of the optical compensative layer (unit: nm).

(34) The polarizing plate according to the aforesaid paragraph (30), wherein an alignment layer is formed between the optical anisotropic layer and the transparent support.

(35) The polarizing plate according to the aforesaid paragraph (30), wherein an alignment layer comprising a cured polymer is formed between the optical anisotropic layer and the transparent support.

(36) The polarizing plate according to the aforesaid paragraph (30), wherein the optical anisotropic layer is of monodomain or forms a number of domain having a size of 0.1 μm or less.

(37) The polarizing plate according to the aforesaid paragraph (30), wherein the matted layer is the hard coat layer of the optical film having matt property according to any one of the aforesaid paragraphs (1)~(5) and (15)~(17), or a lamination layer composed of the hard coat layer and the low refractive index layer of the film having a high transmittance and matt property according to any one of the aforesaid paragraphs (7)~(12) and (21)~(24).

(38) The polarizing plate according to the aforesaid paragraph (30), wherein the matted layer contains particles having a diameter of at least 1.0 μm and a low refractive index layer having a refractive index of 1.45 or less is overlaid on the matted layer.

(39) The polarizing plate according to the aforesaid paragraph (38), wherein the matted layer contains therein monodisperse transparent fine particles comprising a resin having a Moh's hardness of less than 7, an average particle diameter greater than an average thickness of a polymeric binder forming the matted layer, and a particle diameter distribution of 0.2 or less in terms of a variation coefficient.

(40) The polarizing plate according to the aforesaid paragraph (38), wherein the low refractive index layer contains a fluorine-containing compound capable of being crosslinked by heat or ionizing radiation and has a dynamic friction coefficient of 0.15 or less.

(41) The polarizing plate according to the aforesaid paragraph (38), wherein the particles in the matted layer has a Moh's hardness of less than 7.

(42) A liquid crystal display device comprising the polarizing plate according to any one of the aforesaid paragraphs (30)~(41) used as a polarizing plate on the side of backlight out of the two polarizing plates disposed on both sides of the liquid crystal cell, the polarizing plate being arranged in such manner that the matted layer is faced to the backlight side.

(43) A color liquid crystal display device comprising a pair of substrates having transparent electrodes, pixel electrodes, and a color filter, a liquid crystal cell sealed between the substrates and comprised of a twisted nematic liquid crystal, a pair of optical compensative sheets provided on both sides of the liquid crystal cell and a pair of polarizing plates provided respectively on the optical compensative sheets, the polarizing plates according to any one of the aforesaid paragraphs (30)~(41) being used as the optical compensative sheet on the backlight side of the liquid crystal cell and the polarizing plate, the optical anisotropic layer of the polarizing plate being disposed toward the liquid crystal cell side, the optical compensative sheet comprising an optical anisotropic layer having a negative birefringence and comprised of a compound having a discotic structure unit being disposed on the display side of the liquid crystal cell, a disk surface of the discotic structure unit being inclined to the surface of a transparent support, and an angle of the disk surface of the discotic structure unit with the transparent support surface being changed in the direction of depth of the optical anisotropic layer.

(44) The color liquid crystal display device according to the aforesaid paragraph (43), wherein a anti-reflection (reflective) layer is formed on the top surface of the display side of the display side polarizing plate.

(45) The color liquid crystal display device according to the aforesaid paragraph (43), wherein a anti-glare layer is formed on the top surface of the display side of the display side polarizing plate.

(46) The color liquid crystal display device according to the aforesaid paragraph (43), wherein a anti-glare and anti-reflection layer is formed on the top surface of the display side of the display side polarizing plate.

In the aforesaid paragraphs (30)~(46), the optical anisotropic layer preferably satisfies the following conditions:

(i) An angle of a disk surface of the discotic structure unit with the surface of the transparent support is increased with the increase in distance from the surface of the support and the optical anisotropic layer varies in the angle from 5° to 85°.

(ii) The optical anisotropic layer having an angle of a disk surface of the discotic structure unit with the surface of the transparent support the minimum value of which is within the range from 0 to 85° (more preferably, 5~40°), while the maximum value is within the range from 5° to 90° (more preferably, 30~85°).

(iii) The optical anisotropic layer contains cellulose ester (more preferably cellulose acetate butylate).

(iv) The optical anisotropic layer having the minimum value in the absolute value of retardation other than zero in the direction incline from the normal line of the polarizing plate.

(v) The substrate of the liquid crystal cell has an alignment layer subjected to a rubbing treatment in one direction as well as the optical anisotropic layer is arranged in such manner that an angle of the direction in case of positively projecting the direction of the minimum value of retardation of the layer on the liquid crystal cell with the rubbing direction of the substrate of the liquid crystal cell adjacent to the layer is 90~27°.

Other and further objects, features, and advantages of the invention will appear more fully from the following description, taken in connection with the accompanying drawings.

BRIEF DESCRIPTION OF THE DRAWINGS

FIG. 6(a) is a drawing showing a representative construction of the liquid crystal display device employing the polarizing plate of the present invention and FIG. 6(b) is a drawing showing a representative construction of the liquid crystal display device employing the polarizing plate of the present invention jointly with a anti-glare and anti-reflection film of the present invention and the like.

DETAILED DESCRIPTION OF THE INVENTION

Figure 1:
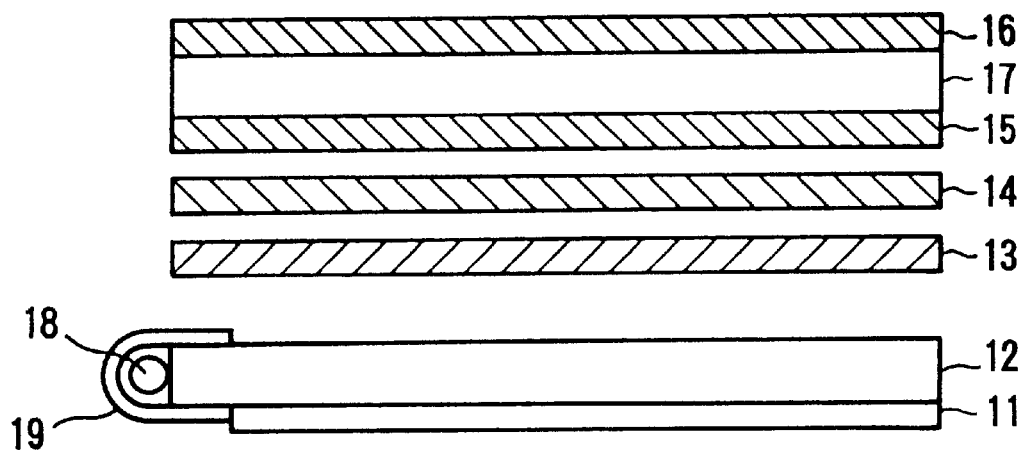
FIG. 1 is a brief schematic side view showing an example of an ordinary liquid crystal display device.

The present invention is divided into the three embodiments of optical films possessing matt property, films having a high transmittance, and polarizing plates and liquid crystal display device, and each embodiment will be explained hereunder in detail.

More precisely, the first embodiment concerned with the aforesaid paragraphs (1)~(14) featured by the surface condition of the optical film, the second embodiment concerned with the aforesaid paragraphs (15)~(29) featured by fine particles incorporated into the optical film, and the third embodiment concerned with the aforesaid paragraphs (30)~(46) featured by a combination of the optical films provided inside and outside the polarizing plate will be explained hereunder in detail. The scope of the present invention involves an invention furnished with any one of the above first to third embodiments, an invention furnished with two of the above first to third embodiments, and an invention furnished with all of the above first to third embodiments.

By the term "matt property" referred to herein is meant a performance that a concavo-convex structure is formed on the surface and non-uniformity due to interference is not generated when brought into contact with a smooth surface. Haze is preferably 1.0~10.0%, more preferably 2.0~6.0%.

The First Embodiment

A basic construction of the optical film possessing matt property, the film having a high transmittance, and the liquid crystal display device using the films of the present invention are explained hereunder, referring to the drawings.

Figure 2:
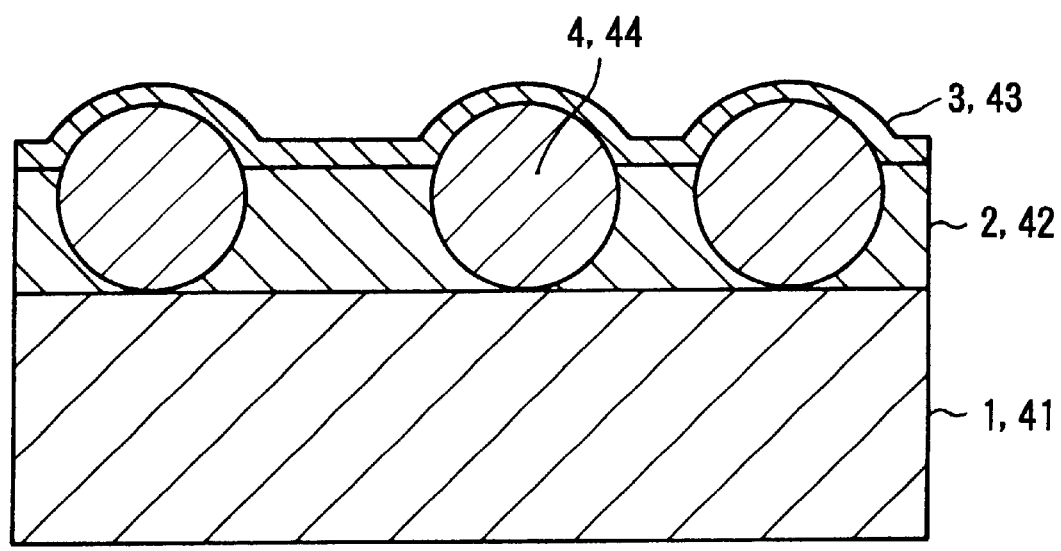
FIG. 2 is a schematic cross sectional view showing the layer construction of the film having a high transmittance and matt property of the present invention.

FIG. 2 is a schematic cross sectional view showing the layer construction of the film having a high transmittance and matt property according to the aforesaid paragraph (10).

The film having a high transmittance and matt property has a layer construction in the written order of a transparent support 1, a hard coat layer 2 and a layer having a low refractive index 3. The hard coat layer contains matt particles 4 which form a concavo-convex structure on the surface and impart haze to the film. The particles 4 has a particle diameter preferably 1.0~15.0 μm, more preferably 3.0~10.0 μm, and as is evident from FIG. 2, the particle 4 is preferably larger in particle diameter than the thickness of the hard coat layer 2.

Surface roughness or an average interval of particles (particle number) can be controlled by adjusting the thickness of the hard coat layer and the size and amount of the particles. The roughness of the surface is preferably within the range of Ra: 0.1~0.3 μm, and more preferably 0.15~0.25 μm. The particle number showing an average interval of the particles is preferably PC: 20~200/cm and more preferably 50~120/cm. No limitation exists in thickness of the hard coat layer. Considering the hardness which is a role of the hard coat layer, however, the thickness is preferably at least 1 μm, and is preferably not more than 8 μm in order to realize high transmittance. The thickness is more preferably 2~4 μm and the haze in this case is preferably 0.5~6% and more preferably 1~4%.

As defined in JIS B0601, Ra (an average roughness on the central line) of the surface roughness is a value in terms of micron obtained according to the following formula when a roughness curve is represented by way of Y=f(x), provided that a measured length L is extracted from the roughness curve in the direction of the central line thereof and a central line of the extracted line is defined as X axis while the direction of a longitudinal magnification is defined as Y axis. Rz (an average roughness of 10 points) is a value in terms of micron obtained by selecting a straight line passing through a third higher mountain and another straight line passing through a third deeper valley, from straight lines parallel to an average line of an extracted curve having a standard length from a sectional curve, and dividing the interval of the two straight lines by the longitudinal magnification. Next, the particle number PC (the number of mountains) showing an average interval of the particles is a value of mountain number per unit length obtained by providing two peak count levels at a level distant by ±0.25 mm parallel from an average line of a sectional curve and measuring how many number of mountains exists within a measurement length, provided that the number of mountain is defined as 1 when the upper peak count level is crossed with the curve at least one time between the 2 points where the lower peak count level is crossed with the curve.

$$Ra = \frac{1}{L}\int_0^L |f(x)|\,dx$$

It is preferable to use a plastic film as the transparent support. Illustrative of materials for the plastic film are cellulose esters (for example, triacetyl cellulose, diacetyl cellulose, propionyl cellulose, butyryl cellulose, acetyl propionyl cellulose and nitrocellulose), a polyamide, a polycarbonate, a polyester (for example, polyethylene terephthalate, polyethylene naphthalate, poly-1,4-cyclohexanedimethylene terephthalate, polyethylene 1,2-diphenoxyethane-4,4'-dicarboxylate or polybutylene terephthalate), a polystyrene (for example, syndiotactic polystyrene), a polyolefin (for example, polypropylene, polyethylene or polymethylpentene), a polysulfone, a polyethersulfone, a polyallylate, a polyether imide, polymethyl methacrylate, and a polyether ketone. Also included are Zeonex (trade name, manufactured by Nippon Zeon Co.) and ARTON (trade name, manufactured by JSR KK) as commercial available products.

The transparent support preferably has a light transmittance of 80% or more, more preferably 86% or more. Haze of the transparent support is preferably 2.0% or less, more preferably 1.0% or less. A refractive index of the transparent support is preferably 1.40 to 1.70.

A sub-layer (undercoat layer) may be provided on the transparent support for imparting tight adherence to adjacent layers. No particular limitation exists in materials for forming such sub-layer. On triacetyl cellulose, for example, gelatin, poly (meth)acrylate resins or a substitute thereof, styrene-butadiene resin, etc. can be used. In addition, a surface treatment such as a chemical treatment, a mechanical treatment, corona treatment, glow discharge treatment, etc. may be carried out.

Viewing from these points, preferable are triacetyl cellulose, polycarbonate, polyethylene terephthalate, Zeonex and ARTON. As a protective membrane for protecting polarizing layers of polarizing plates for use in LCD, triacetyl cellulose is especially preferable.

It is preferable to use a polymer having a saturated hydrocarbon or polyether as a main chain thereof as a compound for use in the hard coat layer. More preferable is a polymer having a saturated hydrocarbon as a main chain. The polymeric binder is preferably crosslinked. The polymer having a saturated hydrocarbon as a main chain thereof is preferably obtained by polymerization reaction of an ethylenically unsaturated monomer. For obtaining a crosslinked polymeric binder, it is preferable to use a monomer having at least two ethylenically unsaturated groups.

Illustrative of the monomer having at least two ethylenically unsaturated groups are an ester of a polyhydric alcohol and (meth)acrylic acid (for example, ethyleneglycol di(meth)acrylate, 1,4-cyclohexanediol diacrylate, pentaerithritol tetra(meth)acrylate, pentaerithritol tri(meth)acrylate, trimethylolpropane tri(meth)acrylate, trimethylolethane tri (meth)acrylate, dipentaerithritol tetra(meth)acrylate, dipentaerithritol penta(meth)acrylate, dipentaerithritol hexa (meth)acrylate, 1,3,5-cyclohexanetriol triacrylate, polyurethane polyacrylate and polyester polyacrylate), vinylbenzene and a derivative thereof (for example, 1,4-divinylbenzene, 4-vinylbenzoic acid-2-acryloylethyl ester, and 1,4-divinylcyclohexanone), a vinylsulfone (for example, divinylsulfone), and an acrylamide (for example, methylene-bis-acrylamide) and a methacrylamide.

A polymer containing a polyether as a main chain thereof is preferably synthesized by ring-opening polymerization of a polyfunctional epoxy compound.

These monomers having ethylenically usaturated groups have to be cured by polymerization due to ionizing radiation or heat after application onto the film. A polymerization reaction by ionizing radiation is preferable and a polymerization reaction by irradiation of ultraviolet rays is more preferable.

For the polymerization reaction by irradiation of ultraviolet rays, a photopolymerization initiator is employed. Examples of the photopolymerization initiator include acetophenone compounds, benzophenone compounds, Michler's benzoylbenzoate, an α-amyloxime ester, tetramethylthiuram monosulfide and thioxanthone compounds. In addition to the photopolymerization initiator, a photosensitizer may be used. Examples of the photosensitizer include n-butylamine, triethylamine, tri-n-butylphosphine, Michler's ketone, and thioxanthone.

The photoinitiator is preferably used in an amount within the range of 0.1~15% by weight for the total amount of the polyfunctional monomer. The use in an amount within the range of 1~10% by weight is more preferable.

In place of or in addition to the monomer having at least two ethylenically unsaturated groups, a crosslinked structure may be introduced into the polymeric binder by the reaction of a crosslinking group. Examples of the crosslinking functional group include isocyanate group, epoxy group, aziridine group, oxazoline group, aldehyde group, carbonyl group, hydrazine group, carboxyl group, methylol group, and active methylene group. Vinylsulfonic acid, an acid anhydride, a cyanoacrylic derivative, melamine, etherified methylol, an ester, a urethane and a metal alkoxide such as tetramethoxysilane can also be utilized as a monomer for introducing a crosslinking structure. A functional group exhibiting crosslinking property as a result of a decomposition reaction such as a blocked isocyanate group may also be used. The term "crosslinking group" referred to herein means a group exhibiting reactivity as a result of a decomposition of the functional group mentioned above and is not limited to the aforesaid compounds.

Compounds having such crosslinking groups have to be crosslinked by heat or the like after applied onto a film.

Illustrative of the matt particles to be incorporated into the hard coat layer are, for example, fine particles of inorganic substances such as silicon dioxide, titanium dioxide, magnesium oxide, calcium carbonate, magnesium carbonate, barium sulfate, and strontium sulfate and fine particles of organic substances such as poly(methyl acrylate), poly (methyl methacrylate), polyacrylonitrile, polystyrene, cellulose acetate, cellulose acetate propionate. As the particles are preferable organic substances among which poly(methyl methacrylate) is especially preferable.

As to the size of the matt particles, those having an average particle diameter of 1~15 μm are preferable and those having a particle diameter of 3~10 μm are especially preferable. The matt particles to be incorporated into the hard coat layer may be a combination of at least two kinds of particles for the purpose of adjusting light scattering capacity and transmittance.

Further, the hard coat layer may be incorporated with inorganic fine particles with a purpose of adjusting the refractive index and enhancing hardness of the membrane. Inorganic fine particles have preferably an average particle size of not more than 0.5 μm and especially preferably not more than 0.2 μm.

Preferable inorganic fine particles are silicon dioxide particles, titanium dioxide particles, aluminum oxide particles, tin oxide particles, calcium carbonate particles, barium sulfate particles, talc, kaolin and calcium sulfate particles. Especially preferable are silicon dioxide particles, titanium dioxide particles and aluminum oxide particles.

An amount of the inorganic fine particles incorporated is preferably 10~90% by weight of the total amount of the hard coat layer, more preferably 20~80% by weight, and especially preferable is 30~60% by weight.

For a low refractive index layer is usually used a fluorine-containing resin membrane, a sol-gel membrane, a laminated membrane of fine particles having a particle diameter of not more than 200 nm, vapor-deposited silicon dioxide membrane each having a refractive index of not more than 1.45, preferably not more than 1.40. The refractive index and membrane thickness of the layer is preferably to satisfy the following formula (I):

$$m\lambda/4 \times 0.7 < n_1 d_1 < m\lambda/4 \times 1.3 \quad (I)$$

wherein m is a positive odd number (generally 1), λ stands for a wave length of light, $n_1$ stands for a refractive index of the low refractive index layer, and $d_1$ stands for a membrane thickness of the low refractive index layer.

A concrete compound used for the low refractive index layer includes a compound containing a fluorine atom, a silicon compound substituted by an organic group and represented by the following formula and a hydrolysate thereof:

$$R^1_a R^2_b SiX_{4-(a+b)}$$

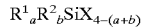

wherein $R^1$ and $R^2$ each stands for a hydrocarbon group having an alkyl group, an alkenyl group, an allyl group or a halogen atom, an epoxy group, an amino group, a mercapto group, methacryloxy group or a cyano group, X stands for a hydrolysable substituent selected from an alkoxyl group, an alkoxyalkoxyl group, a halogen atom or an acyloxy group, a and b each stands for 0, 1 or 2 and a+b stands for 1 or 2.

Among these compounds, a compound having a fluorine atom is preferable and a fluorine-containing high molecular compound is more preferable. In particular, a fluorine-containing compound capable of being crosslinked by heat or ionizing radiation is especially preferable. A crosslinkable fluorine-containing high molecular compound is useful in the viewpoint of applicability. Other compounds may jointly be used to regulate applicability and membrane hardness.

Illustrative of the crosslinkable fluorine-containing high molecular compound are silane compounds having a perfluoroalkyl group or groups [for example, (heptadecafluoro-1,1,2,2-tetradecyl)triethoxysilane] and a fluorine-containing copolymer containing a fluorine-containing monomer and a monomer for imparting crosslinking groups as a construction unit.

Examples of the fluorine-containing monomer unit include, for example, fluoroolefins (for example, fluoroethylene, vinylidene fluoride, tetrafluoroethylene, hexafluoropropylene, perfluoro-2,2-dimethyl-1,3-dioxole, etc.), a partially or completely fluorinated alkyl ester of (meth)acrylic acid [for example, Biscoat 6FM (trade name, manufactured by Osaka Yukikagaku KK) and M-2020 (trade name, manufactured by Daikin KK), and a partially or completely fluorinated vinyl ethers.

Illustrative of the monomer imparting crosslinking groups are, in addition to (meth)acrylate monomer having previously a cross-lining function in the molecule thereof such as glycidyl methacrylate, a (meth)acrylate monomer having carboxyl groups, hydroxyl groups, amino groups or sulfonic acid groups (for example, (meth)acrylic acid, methylol (meth)acrylate, hydroxyalkyl (meth)acrylate, allyl acrylate, etc.). The latter mentioned monomer is known in JP-A No. Hei. 10-25388 and JP-A No. Hei. 10-147739 as a monomer capable of introducing a crosslinking structure after copolymerization. Compounds other than these may jointly be used.

As disclosed in JP-A No. Hei. 9-288201, a low refractive index layer can be formed by homogeneously containing aerial or vacuum microvoids having a size smaller than wave length of light in the layer.

The fluorine-containing high molecular compound may contain in the construction unit thereof a monomer free of fluorine atom. No particular limitation exists in utilizable monomer units. For example, olefins (ethylene, propylene, isoprene, vinyl chloride, vinylidene chloride, etc.), esters of acrylic acid (methyl acrylate, ethyl acrylate, 2-ethylhexyl acrylate), esters of methacrylic acid (methyl methacrylate, ethyl methacrylate, butyl methacrylate, ethylene glycol dimethacrylate, etc.), styrene derivatives (styrene, divinylbenzene, vinyltoluene, α-methylstyrene, etc.), vinyl ethers (methyl vinyl ether, etc.), vinyl esters (vinyl acetate, vinyl propionate, vinyl cinnamate, etc.), acrylamides (N-tert-butylacrylamide, N-cyclohexylacryl-amide, etc.), methacrylamides and acrylonitrile derivatives.

The low refractive index layer preferably has a dynamic friction coefficient of not more than 0.2, if possible, not more than 0.15, for imparting scratch-resisting property.

Each layer of the optical film possessing matt property and the film having a high transmittance can be formed by applying the materials according to the dip coating method, the air-knife coating method, the curtain coating method, the roller coating method, the wire bar coating method, the gravure coating method and the extrusion coat method (U.S. Pat. No. 2,681,294). Two or more layers may be coated at the same time. A means for coating layers at the same time is disclosed in U.S. Pat. Nos. 2,761,791, 2,941,898, 3,508, 947 and 3,526,528 and a Japanese book entitled "Kotingu Kogaku (Coating Technology)" written by Yuji Harazaki, p. 253, published by Asakura Shoten (1973).

The optical film of matt property of the present invention has a light transmittance of at least 90%, preferably at lest 92%. The optical film of matt property and the film having a high transmittance of the film having a high transmittance and matt property are applied to liquid crystal display device.

The foregoing is an embodiment of the film having a high transmittance and matt property shown in FIG. 2 concerned with aforesaid paragraphs (7)~(12). What is omitted from this embodiment with respect to the low refractive index layer on the surface is an embodiment of the optical film of matt property concerned with the aforesaid paragraphs (1)~(5) so that the above explanation is directly applied to the latter.

The optical film of matt property and the film having a high transmittance of the present invention are employed for a liquid crystal display device. However, the liquid crystal display device is not limited to one shown in the foregoing FIG. 1 and can be used for liquid crystal display devices of various embodiments.

The optical film of matt property and the film having a high transmittance are used as at least one of the two protective films of the polarizing layer in the polarizing plate by being bound thereto with the aid of a binder so as to face the transparent support side to the polarizing plate or alternatively so as to dispose the matted layer on the opposite side of the polarizing plate. The optical film of matt property and the polarizing plate having a high transmittance are disposed in a liquid crystal display device as a polarizing plate of the backlight side out of the two polarizing plates disposed on both sides of a liquid crystal cell in such manner that the matted layer may exist toward the backlight side.

The Second Embodiment

The optical film of matt property and the film having a high transmittance as well as a liquid crystal display device using these films of the second embodiment are significantly featured by incorporating specific fine particles into the optical film. More precisely, monodisperse transparent fine particles having an average particle diameter greater than the thickness of the hard coat layer and a particle diameter distribution of not more than 0.2 in terms of a variation coefficient and inorganic fine particles having been treated on the surface thereof with a silane-coupling agent are employed.

The transparent fine particles having an average particle diameter greater than the thickness of the hard coat layer are allowed to be present as particles of matt property. Illustrative of the particles of matt property to be incorporated are fine particles powder of inorganic substances such as silicon dioxide, titanium dioxide, magnesium oxide, calcium carbonate, magnesium carbonate, barium sulfate and strontium sulfate and fine particles powder of organic substances such as poly(methyl acrylate), poly(methyl methacrylate), polyacrylonitrile, polystyrene, cellulose acetate and cellulose acetate propionate. Among these substances, preferable are silicon dioxide as the inorganic substance and poly(methyl methacrylate) as the organic substance. The particles of matt property are preferably highly monodisperse spherical particles unlike amorphous particles.

Concerning the size of the particles of matt property, those having an average particle diameter of 1.0~15.0 μm are preferable and those having an average particle diameter of 3.0~10.0 μm are especially preferable. Concerning the particle diameter distrubution, a variation coefficient of not more than 0.2 is preferable and monodisperse particles having a variation coefficient of not more than 0.1 are especially preferable.

By the term "variation coefficient" referred to herein is defined a value obtained according to the following formula (II):

$$\sqrt{\frac{\sum (\bar{r} - r_1)^2 \cdot n_i}{\sum n_i}} \div \bar{r} \quad \text{(II)}$$

wherein r stands for a number average particle diameter, $n_i$ stands for a number of particles of ordinal i number, and $r_i$ stands for the particle diameter of a particle of ordinal i number.

In case the particles of matt property are to be incorporated into the hard coat layer, it is preferable to use a combination of an average particle diameter of the particles of matt property being 0.5~5.0 μm larger than the thickness of the hard coat layer. Especially preferable combination is an average particle diameter of 1.0~3.0 μm larger than the thickness.

In case the particles of matt property are incorporated into the hard coat layer, two or more of the particles may be used in combination to adjust haze. The particles smaller than the thickness of the hard coat layer are not included in the particles of matt property.

An application density of the particles of matt property depends on the degree of haze, but preferably is within the range of 100~5000 particles/m², more preferably 200~2000 particles/m².

The hard coat layer is further incorporated with the inorganic fine particles having been treated on the surface thereof with a silane-coupling agent. Examples of the inorganic fine particles include silicon dioxide particles, titanium dioxide particles, aluminum oxide particles, tin oxide particles, calcium carbonate particles, barium sulfate particles, talc, kaolin, and calcium sulfate particles. Silicon dioxide particles (colloidal silica) are particularly preferred.

The inorganic fine particles are very fine particles of a particle diameter smaller than that of the particles of matt property mentioned above, and an average particle diameter thereof is preferably 1~2000 nm, more preferably 2~1000 nm, further more preferably 5~500 nm, and most preferably 10~200 nm.

The amount of the inorganic fine particles incorporated is preferably 1~99% by weight based on the total amount of the hard coat layer (except for the particles of matt property), more preferably 10~90% by weight, further more preferably 20~80% by weight, and most preferably 30~60% by weight.

The inorganic fine particles have been treated on the surface thereof with a silane-coupling agent. This surface treatment herein means coating of a part or all of the surface. The treatment of the whole surface is preferred. It is preferable to use the silane-coupling agent for chemically bonding to the crosslinked polymeric binder. The formation of a chemical bond is easily and preferably carried out by introducing a similar polymerizing group or a crosslinking group to that of the polymeric binder into the silane-coupling agent and reacting a part of the polymeric binder with the silane-coupling agent in the polymerization reaction or crosslinking reaction of the polymeric binder. In case a polymeric binder is synthesized from a monomer having ethylenically unsaturated groups as the polymerizing and crosslinking groups, for example, it is preferred that the silane-coupling agent also having ethylenically unsaturated groups.

Preferable silane-coupling agents are compounds represented by the following formula (Ia), (Ib), (Ic), (Id) or (Ie):

-continued

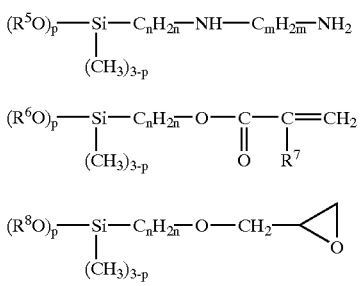

(Ic)

(Id)

(Ie)

In these formulas (Ia), (Ib), (Ic), (Id) and (Ie), $R^1$, $R^2$, $R^3$, $R^4$, $R^5$, $R^6$ and $R^8$ each stands independently for an alkyl group having 1~4 carbon atoms (for example, methyl, ethyl) or an alkoxyalkyl group having 2~4 carbon atoms (for example, methoxyethyl). An alkyl group is more preferable than an alkoxyalkyl group. An alkyl moiety of the alkyl and alkoxyalkyl groups is preferably of a chain structure in place of a cyclic structure. The chain structure may be a straight chain or a branched chain.

In the formula (Id), $R^7$ stands for a hydrogen atom or an alkyl group having 1~4 carbon atoms (for example, methyl, ethyl). Hydrogen atom or methyl group is preferable and methyl group is especially preferable.

In the formulas (Ib), (Ic), (Id) and (Ie), n stands for 2 or 3.

In the formula (Id), m stands for 2 or 3.

In the formulas (Ib), (Ic), (Id) and (Ie), p stands for 2 or 3.

In case a polymeric binder is synthesized from a monomer having an ethylenically unsaturated group as polymerizing group and crosslinking group, it is especially preferred to use a silane-coupling agent of the formula (Ia) or (Id) having an ethylenically unsaturated group.

Examples of the silane-coupling agent are shown below.

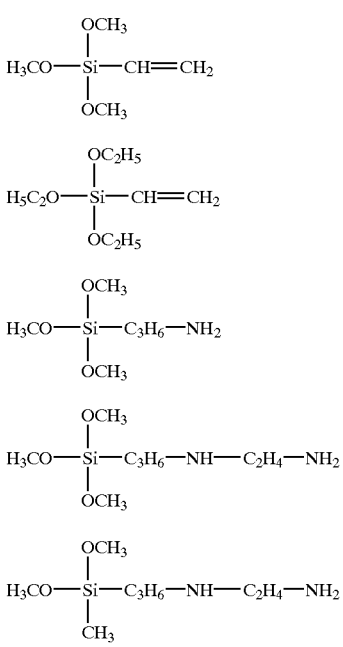

-continued

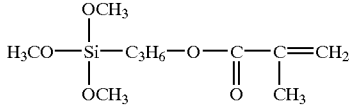
(I-6)

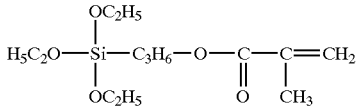
(I-7)

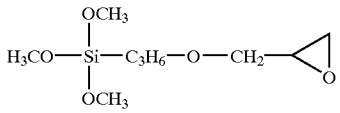
(I-8)

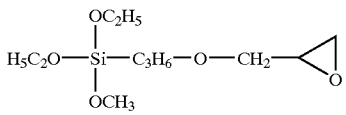
(I-9)

In this embodiment, the same transparent support, compounds used for the hard coat layer and low refractive index layer as in the aforementioned embodiment can also be used.

The hard coat layer has preferably a thickness of 0.5~10.0 μm, more preferably 0.5~7.0 μm.

Methods for forming individual layers of the optical film of matt property and the film having a high transmittance and application to a polarizing plate and a liquid crystallizing display device are same as in the first embodiment.

The foregoing relates to an embodiment of the film having a high transmittance and matt property shown in FIG. 2 and concerned with the aforesaid paragraphs (21)~(24). What is excluded therefrom with respect to the low refractive index layer on the surface is an embodiment of the optical film of matt property concerned with the aforesaid paragraphs (15)~(17), and so the aforementioned explanation is directly applied thereto.

The Third Embodiment

A basic construction of the polarizing plate having a high transmittance, matt property and the optical compensative capacity as the third embodiment of the present invention and a liquid crystal display device using the polarizing plate will be explained with reference to the drawings.

Figure 3:
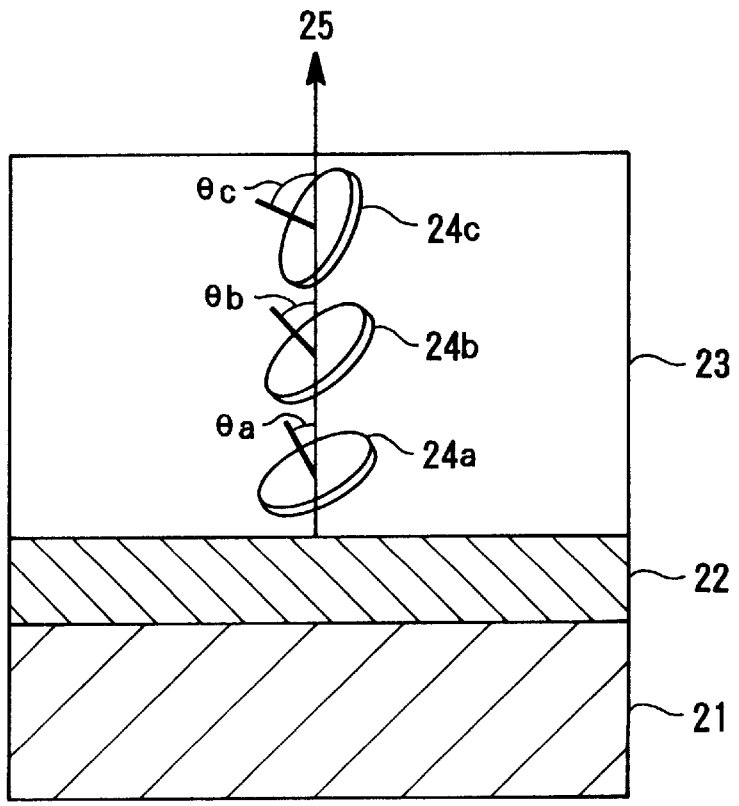
FIG. 3 is a schematic cross sectional view showing a representative layer construction of the optical compensative film.

FIG. 3 is an example of a schematic cross sectional view showing the layer construction of the optical compensative layer. The optical compensative layer has a layer construction of a transparent support 21, an alignment layer 22, and an optical anisotropic layer 23 in the written order. The optical anisotropic layer contains liquid crystalline discotic compounds 24a, 24b and 24c and their light axes have inclined angles of θa, θb and θc with the direction of a normal line 25 of the transparent support. These inclined angles are increased from the transparent support side of the optical anisotropic layer toward the surface side thereof.

Figure 4:
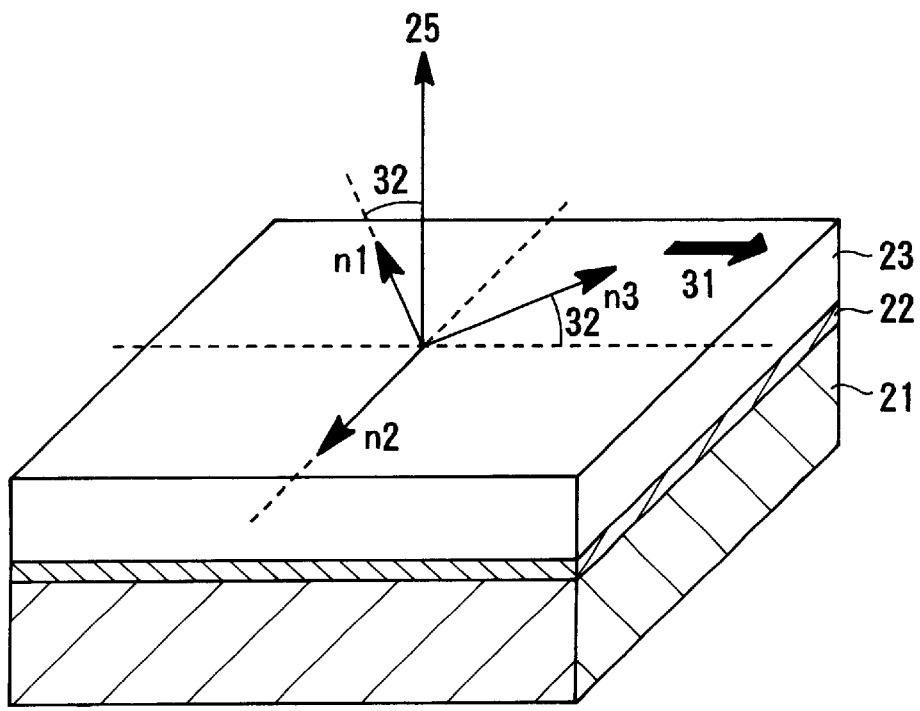
FIG. 4 is a drawing showing the relation of a representative construction of the optical compensative film and main refractive indices of three axes.

FIG. 4 shows optical characteristics of the optical compensative layer. The alignment layer is subjected to a rubbing or the like treatment for alignment of the liquid crystalline discotic compound. The notation 31 shows a rubbing direction of the alignment layer. The notations n1, n2 and n3 stand for refractive indices of three orthogonal axes of the optical compensative layer. Viewing from the front, the axes satisfy a relation of $n1 \leq n3 \leq n2$.

The optical compensative layer has a minimum value in the absolute value other than zero of retardation in the direction inclined from a normal line direction of the transparent support. In the drawing, the notation 32 stands for an angle of the direction showing the minimum value in the absolute value of retardation with the normal line direction 25 of the transparent support. In order to improve viewing angle characteristics of TN-LCD, the angle 32 is preferably 5~50° and especially preferable is 10~40°.

The optical compensative layer satisfies the following formula:

$$20 \leq \{(nx+ny)/2-nz\} \times d \leq 400$$

wherein nx, ny, and nz stand for main refractive indices of three orthogonal axes of the transparent support, nz stands for a main refractive index in the direction of thickness of the transparent support, and d stands for a thickness of an optical compensative layer (unit: nm).

Preferably the optical compensative layer also satisfies the following formula:

$$50 \leq \{(nx+ny)/2-nz\} \times d \leq 400$$

Further preferably the optical compensative layer further satisfies the following formula:

$$100 \leq \{(nx+ny)/2-nz\} \times d \leq 400$$

As the transparent support for the optical compensative layer, similar materials as stated in the first and second embodiments can be used. However, if a main refractive index of the transparent support surface is nx and ny while a main refractive index in the direction of thickness is nz and the thickness is d, the relation of the main refractive indices is to satisfy nz<ny=nx (negative uniaxial) and a retardation represented by $\{(nx+ny)/2-nz\} \times d$ is to be 20~400 nm. A retardation of the transparent support is more preferably 30~150 nm. It is not necessary that nx and ny are strictly equal, and no problem arises if $|nx-ny|/|nx-nz| \leq 0.2$. A front retardation represented by $|nx-ny| \times d$ is preferably not more than 50 nm and further preferably not more than 20 nm.

The alignment layer functions to determine the alignment direction of a liquid crystalline discotic compound provided thereon. This alignment (orientation) gives a light axis inclined from the normal line direction of the transparent support. No limitation exists if the alignment layer imparts alignment to the optical anisotropic layer. Preferable examples of the alignment layer include a layer formed by an organic compound and then subjected to rubbing treatment, an oblique vapor-deposition layer of an inorganic compound, a microgroove layer formed by patterning or the like treatment of a resist, a Langmuir-Blodgett membrane of ω-tricosane, dioctadecyl-methylammonium chloride and methyl stearate and dielectrics layer aligned by electric field or magnetic field. A layer subjected to a rubbing treatment is preferable as it is simple and cheap in production.

Illustrative of organic compounds for the alignment layer are polymers such as poly(methyl methacrylate), acrylic acid/methacrylic acid copolymer, styrene/maleimide copolymer, poly(vinyl alcohol), poly(N-methylolacrylamide), styrene/vinyltoluene copolymer, chlorosulfonated polyethylene, nitrocellulose, poly(vinyl chloride), chlorinated polyolefins, polyesters, polyimides, vinyl acetate/vinyl chloride copolymer, ethylene/vinyl acetate copolymer, carboxymethylcellulose, polyethylene, polypropylene and polycarbonate; and silane-coupling agents. Among these, polyimides, polystyrene, poly(vinyl alcohol) and alkyl-modified poly(vinyl alcohol) having alkyl groups (preferably, at least 6 carbon atoms). Alkyl (preferably at least 6 carbon atoms)-containing alkyl-modified poly(vinyl alcohol) is especially preferable. As polyimide is mentioned polyamic acid (for example, LQ/LX series (trade name, manufactured by Hitachi Kasei KK) and SE series (trade name, manufactured by Nissan Kagaku KK), etc.) coated and baked at 100~300° C. for 0.5~1 hour. As the alkyl-modified poly(vinyl alcohol) is mentioned MP103, MP203 and R1130 (trade names, each manufactured by Kuraray Co.).

A treatment widely adopted for a liquid crystal alignment treatment of LCD can be utilized as the above rubbing treatment. More precisely, a method wherein the surface of an alignment layer is rubbed with gauze, felt, rubber, nylon, polyester.fibers, or the like in a given direction can be utilized. In general, a rubbing treatment is carried out several times with a cloth evenly embedded with fibers having definite length and diameter.

The optical anisotropic layer may be aligned without using the alignment layer. For this, a method is mentioned wherein a liquid crystalline discotic compound layer forming the optical anisotropic layer is aligned by subjecting it to the influence of electric field, magnetic field, polarizing radiation or oblique non-polarizing radiation, etc.

The optical anisotropic layer is a layer having negative birefringence comprised of a compound containing discotic structure units. The optical anisotropic layer is a layer of a liquid crystalline discotic compound or a polymer layer obtained by curing of a polymerizable discotic compound. Illustrative of the discotic compound for the present invention are benzene derivatives disclosed in a study report of C. Destrade et al., *Mol. Cryst.*, 71, 111 (1981); truxene derivatives disclosed in *Mol. Cryst.*, 122, 141 (1985) and Physics. Lett. A, 78, 82 (1990); cyclohexane derivatives disclosed in a study report of B. Kohne et al., *Angew. Chem. Soc.*, 96, 70 (1984); macrocycles of azacrown series and phenylacetylene series disclosed in a study report of J. M. Lehn et al., *J. Chem. Commun.* 1794 (1985), and a study report of J. Zhang et al., *J. Am. Chem. Soc.* 116, 2655 (1994). The aforesaid discotic (disc-like) compound generally is crystalline and has a structure wherein these compounds are existent in the center of the molecule as mother nucleus and a linear alkyl or alkoxyl groups and substituted benzoyloxy group, etc. are substituted radially as side chains. In general, compounds called discotic liquid crystals are contained in this compound. However, the discotic compound for the present invention is not limited to the above description if the compound per se has a negative uniaxial property and is capable of imparting a definite alignment. The phrase "formed from the discotic compound" referred to herein means that the finally formed compound is not necessarily the discotic compound and, for example, a low molecular discotic liquid crystal, which has a functional group capable of crosslinking by heat or irradiation of ionizing radiation and is converted into a higher molecular compound to lose liquid crystalline property by heat or irradiation of ionizing radiation, is also included.

Preferable examples of the discotic compound include the following:

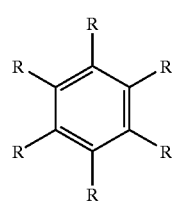

TE-1

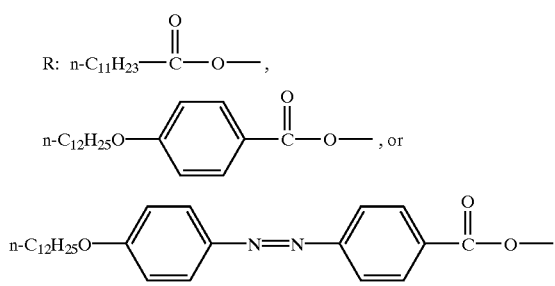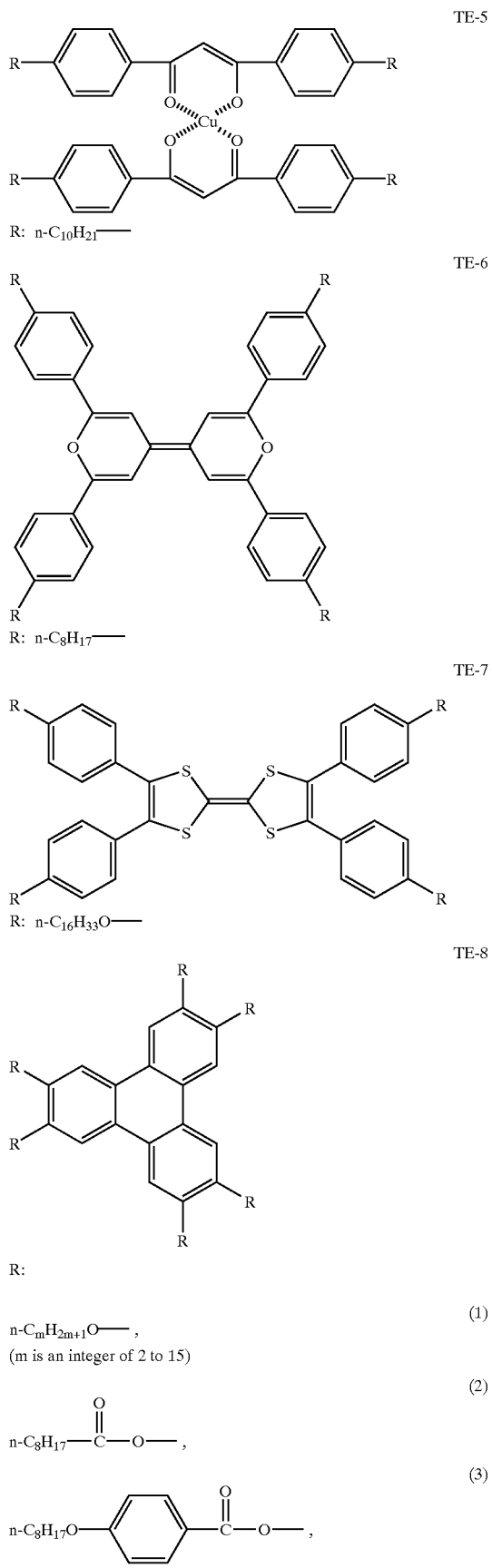

The optical anisotropic layer is obtained by applying a coating liquid dissolving the discotic compound and other compounds onto the alignment layer, drying the coated alignment layer, heating the layer up to a discotic nematic phase-forming temperature and cooling the coated layer while holding the alignment state. Or alternatively, the alignment layer is heated up to a discotic nematic phase-forming temperature and thereafter polymerized and fixed by irradiation of ionizing radiation. A temperature for the discotic nematic liquid phase-solid phase transition is preferably 50~300° C. and especially preferably 70~170° C.

The optical anisotropic layer may be incorporated with any of the compounds such as a plasticizer, a surfactant, a polymerizable monomer, a high molecular compound, etc. for controlling the inclined angle of the liquid crystalline discotic compound, a discotic nematic phase-forming temperature, compatibility, coating property, etc. so far as the alignment of the discotic compound is not disturbed.

A polymerizable monomer preferably has a vinyl group, a vinyloxy group, an acryloyl group and a methacryloyl group. The polymerizable monomer can be used in an amount of 1~50% by weight, preferably 5~30% by weight based on the discotic compound.

Any of the high molecular compounds can be used so far as they possess compatibility with the discotic compound. The high molecular compound is preferably cellulose esters. Above all, cellulose acetate butyrate is especially preferable. The high molecular compound can be used in an amount of 0.1~10% by weight, preferably 0.1~5% by weight based on the discotic compound. A butyrating degree of the cellulose acetate butyrate is preferably 30~80% while an acetylating degree thereof is preferably 30~80%.

FIG. 2 is an example of the schematic cross sectional views of a layer construction of the layer having a high transmittance and matt property. The layer having a high transmittance and matt property has a layer construction of a transparent support 41, a matted layer 42 and a low refractive index layer 43 in the written order. The matted layer contains matt particles 44 having a Moh's hardness of less than 7 and the particles serve to form a concavo-convex structure on the surface and impart haze to the film.

The transparent support used for the layer having a high transmittance and matt property may be the same as described in the aforesaid first and second embodiments.

No particular limitation exists in the polymeric binder used for the matted layer if it is a high molecular compound. The binder may be a crosslinked material obtained by application of heat or ionizing radiation to a low molecular compound such as a polymerizable monomer. The binder may preferably have a hard coat property lest the binder itself would be scratched at the time of processing. The polymeric binder having the hard coat property may be the same as described in the foregoing first and second embodiments.

The matt particles to be incorporated into the matted layer are preferably a material comprised of a resin having a Moh's hardness of less than 7. Illustrative of the resin are poly(methyl methacrylate) resin, fluororesins, vinylidene fluoride resin, silicone resins, epoxy resins, nylon resins, polystyrene resin, phenol resins, polyurethane resins, crosslinked acrylic resins, crosslinked polystyrene resins, etc. The matt particles are preferably insoluble in water and organic solvents. The matt particles preferably have a size of an average particle diameter of 1~10 μm, and especially preferably 3~7 μm. A particle diameter distribution of the particles is preferably a variation coefficient of 0.2 or less, and the particles having a high monodispersibility and a variation coefficient of 0.1 or less are especially preferable. The matt particles to be incorporated into the hard coat layer may be combined with at least two kinds of particles to adjust haze. Further, the matted layer may be incorporated with inorganic fine particles as described in the first embodiment to adjust its refractive index and to enhance the curing strength of the membrane.

The matted layer (hard coat layer) has preferably a thickness of 1~15 μm.

Compounds utilizable for the low refractive index layer are similar to those described in the first and second embodiments.

Each of the optical compensative layer and the layer having a high transmittance and matt property can be formed by applying the materials according to the dip coating method, the air-knife coating method, the curtain coating method, the roller coating method, the wire bar coating method, the gravure coating method and the extrusion coating method (U.S. Pat. No. 2,681,294). Two or more layers may be coated at the same time. A means for coating layers at the same time is disclosed in U.S. Pat. Nos. 2,761,791, 2,941,898, 3,508,947 and 3,526,528 and a Japanese book entitled "Kotingu Kogaku (Coating Technology)" written by Yuji Harazaki, p. 253, published by Asakura Shoten (1973).

Figure 5:
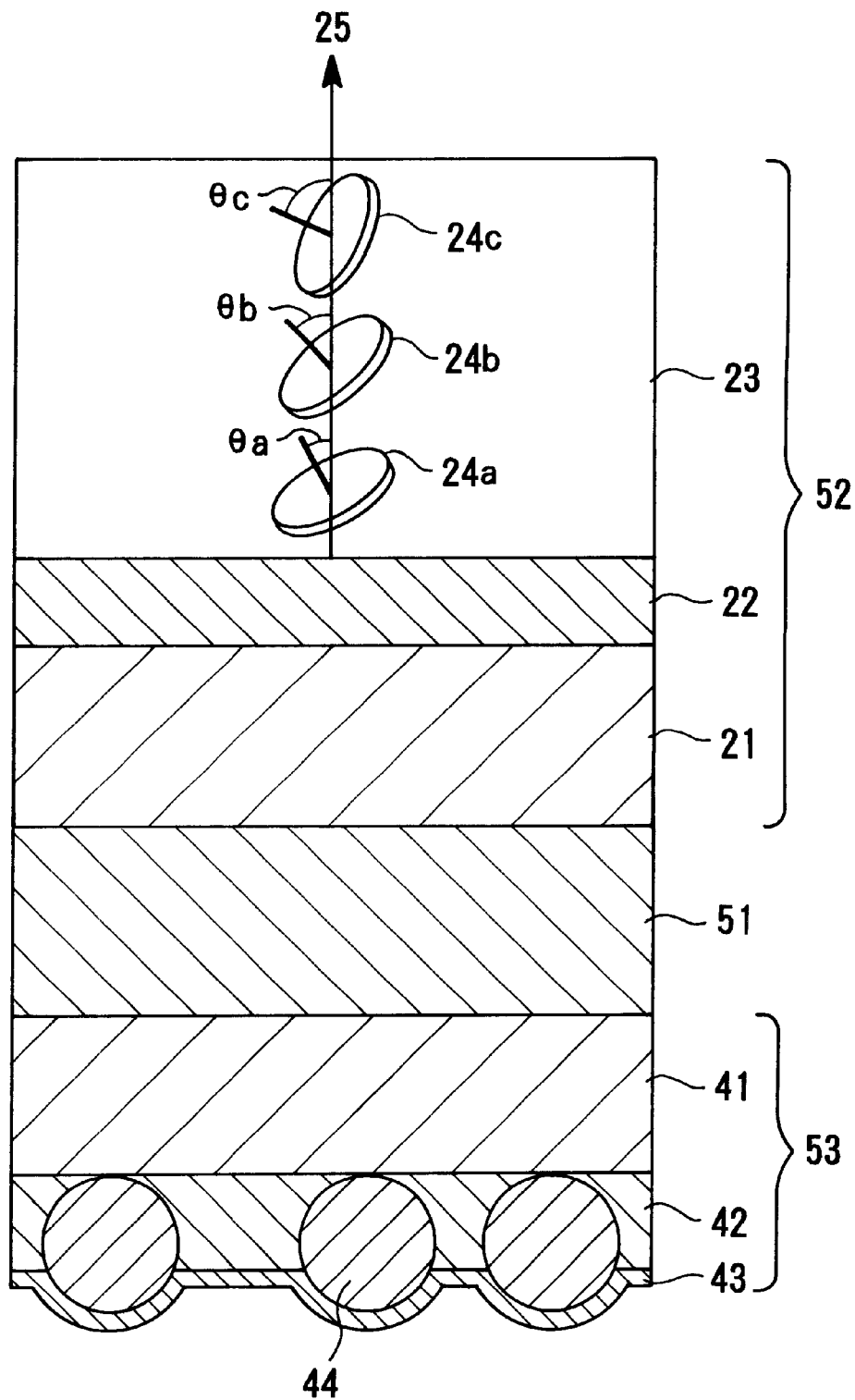
FIG. 5 is a schematic sectional view showing a representative layer construction of a polarizing plate having a high transmittance and matt property as well as optical compensative capacity.

FIG. 5 shows an example of the construction drawings of the polarizing plate having a high transmittance and matt property as well as optical compensative capacity of the present invention. The polarizing plate of the present invention comprise two transparent supports 21, 41, a polarizing layer 51 interposed therebetween, an optical compensative layer (film) 52 containing an optical anisotropic layer 23 on the surface opposite to the polarizing layer of one of the transparent supports, and a layer (film) 53 having a high transmittance and matt property on the surface opposite to the polarizing layer of the other transparent support.

Figure 6A:
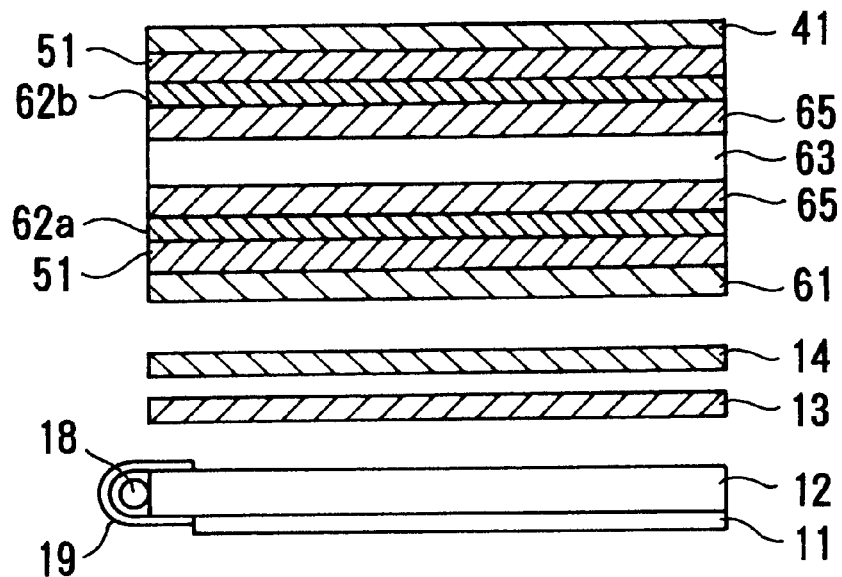

The polarizing plate of a high transmittance according to the present invention having optical compensative capacity and matt property can be applied to a liquid crystal display device. FIG. 6(a) shows an example of the construction drawings of a liquid crystal display device. The layer (film) 61 having a high transmittance and matt property is disposed as a polarizing plate on the side of a backlight in such manner that the matted layer is faced to the backlight while the optical compensative layer (film) 62a is stuck to a liquid crystal cell 63 by the aid of a binder 65 or the like. This polarizing plate having the optical compensative layer is also used as a polarizing plate on the side of display while the optical compensative layer (film) 62b is stuck to the liquid crystal cell by the aid of a binder or the like.

Figure 6B:
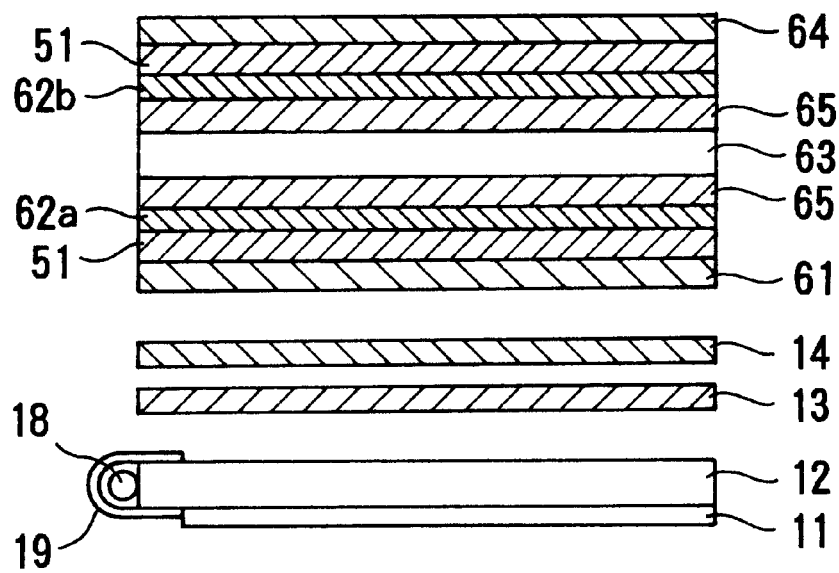

On the display side of the polarizing plate on the side of display, i.e., on the top surface of the liquid crystal display device can be provided a layer for preventing deterioration of display quality by reflection of external light, such as a anti-reflection (reflective) layer, a anti-glare layer, a anti-reflection and anti-glare layer, etc. for preventing deterioration of images by reflection. Mentioned as this anti-reflection layer are, for example, a multi-layer vapor deposition membrane formed on a transparent support as disclosed in JP-B ("JP-B" means examined Japanese patent publication) No. Sho. 45-6193, low refractive index organic compounds comprising a fluorine-containing compound, etc. coated on a transparent support as disclosed in JP-A No. Sho. 57-34507 and a coating of a low refractive index layer containing therein microvoids smaller than the wave length of light as disclosed in JP-A No. Hei. 9-288201. Further, mentioned as the anti-glare layer are a concave-convex layer of a binder incorporated with particles applied onto a transparent support as disclosed in JP-A No. Sho. 61-209154, a film previously forming a concavo-convex surface stuck to a coating layer on a transparent support to transfer the concave-convex structure as disclosed in JP-A No. Hei. 6-16851, and a transparent support forming thereon a concavo-convex structure directly or via another layer such as a hard coat layer by embossing finish. Mentioned as the anti-reflection and anti-glare layer are a anti-reflection layer provided on a anti-glare layer as disclosed in JP-A No. Hei. 6-11706 and a anti-reflection layer forming thereon a concavo-convex structure by embossing finish. A construction drawing of a liquid crystal display device using the anti-reflection layer, the anti-glare layer or the anti-reflection and anti-glare layer is shown in FIG. 6(b) wherein the numeral 64 denotes the anti-reflection layer, the anti-glare layer or the anti-reflection and anti-glare layer.

Figure 7:
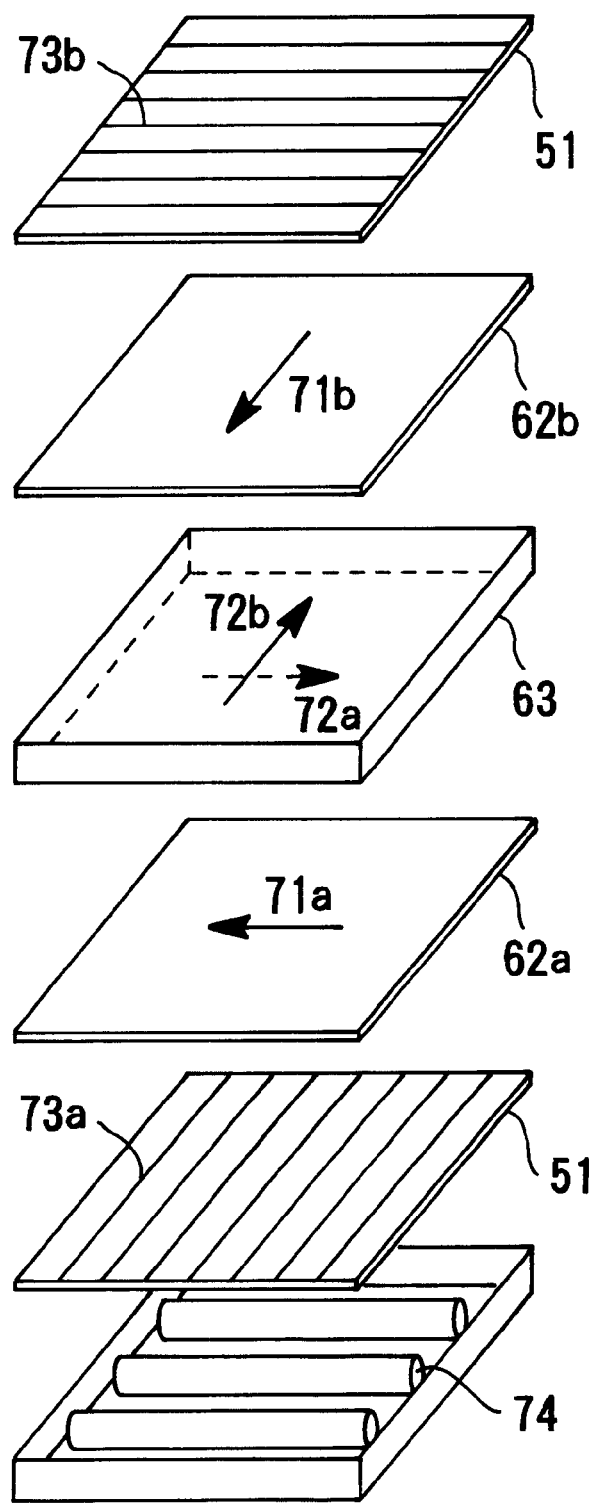
FIG. 7 is a drawing showing a representative structure of the liquid crystal display device of the present invention.

FIG. 7 is a representative drawing of disposition for the polarizing plate of the present invention for carrying out optical compensation. A backlight 74 side is a lower side, and a rubbing direction of a lower optical compensative layer 62a is 71a while a rubbing direction of an upper optical compensative layer 62b is 71b. A broken arrow mark 72a of a liquid crystal cell 63 shows a rubbing direction of a liquid crystal cell substrate on the side of the backlight while a solid line 72b shows a rubbing direction of a liquid crystal cell substrate on the side of the display. The notations 73a and 73b respectively shows axes of transmittance.

As a drawing of disposition other than FIG. 7, the optical compensative layer may not be provided in the form divided into 2 polarizing plates as described above. In other words, two optical anisotropic layers may be provided on the side of the liquid crystal cell of the lower polarizing plate.

Figure 8:
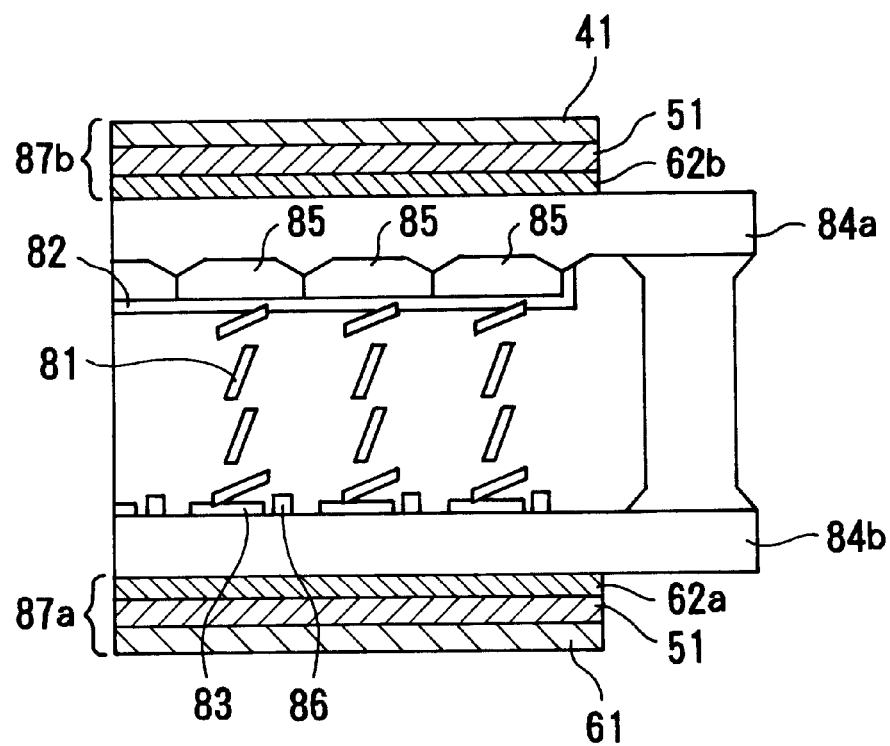
FIG. 8 is a drawing showing a representative structure of the color liquid crystal display device of the present invention.

FIG. 8 shows a representative construction drawing of a color liquid crystal display device of the present invention. In FIG. 8, the color liquid crystal display device is constructed by a liquid crystal cell comprising a glass substrate 84a provided with a facing transparent electrode 82 and a color filter 85, a glass substrate 84b provided with pixel electrodes 83 and TFT 86, and twisted nematic liquid crystals (twisted nematic liquid crystalline molecules) 81 interposed between the two substrates, and a pair of polarizing plates 87a (a lower polarizing plate) and 87b (a upper polarizing plate) provided on both sides of the liquid crystal cell. Among these parts, the notation 87a is the polarizing plate of the present invention and the notation 87b may be an optical anisotropic layer as shown in the drawing. Or alternatively, the lower polarizing plate may be provided with two optical anisotropic layers as described above.

The optical film of matt property or the film having a high transmittance and matt property of the present invention are excellent in matt property so that non-uniformity of display and brightness can be improved without necessity of decreasing transmittance of polarizing plates, thus enhancing display quality of liquid crystal display devices, by using the film on backside of a liquid crystal cell.

The matted film exhibited in the second embodiment is especially excellent in scratch-resistance, curl value and matt property so that a film having high transmittance and matt property manufactured by providing this matted film with a low refractive index layer is superior in light transmittance. By using these films as a protective film for polarizing layers, scratch-resistance, strain-resistance, matt property and light transmittance of the polarizing plates can be improved. The scratch-resistance can further be improved by a given low refractive index layer. A liquid crystal display device using such films or polarizing plates are prevented from the generation of non-uniformity in display and brightness, thus exhibiting high display quality in stable condition.

By using the polarizing plates of high transmittance having the optical compensative capacity and matt property as exhibited in the third embodiment as well as a liquid crystal display device or color liquid crystal display device using thereof, occurrence of Newton ring caused by contact with a light-tuning film or non-uniformity in brightness due to the light-tuning film can be improved. In addition, by enlarging the viewing angle of a liquid crystal display device or color liquid crystal display device in TN-mode, a liquid crystal display device showing an excellent display quality in all directions can be provided. Furthermore, these display devices can be produced in a simple and stable manner by using merely coating which is an advantageous method in mass-production. Accordingly, a high transmittance polarizing plate possessing an optical compensative capacity and matt property can be supplied economically.

The present invention will now be illustrated more in detail by way of examples, but the present invention is not limited by these examples.

EXAMPLES

Example 1

A coating liquid for a hard coat layer and a coating liquid for a layer of a low refractive index are prepared as follows:
(Preparation of a Coating Liquid A-1 for a Hard Coat Layer)

In a mixed solvent comprising 78.8 g of isopropanol, 157.2 g of methyl isobutyl ketone and 102.1 g of methanol was dissolved 256.5 g of a mixture of dipentaerythritol pentaacrylate and dipentaerithritol hexaacrylate (DPHA (trade name, manufactured by Nihon Kayaku KK)). The resultant solution was incorporated with 5.4 g of a photopolymerization initiator (Irgacure 907 (trade name, manufactured by Ciba-Geigy Co.)). The mixture was stirred to dissolve the initiator and filtered through a filter made of polypropylene having a pore diameter of 1 μm to prepare a coating liquid A-1 for a hard coat layer.
(Preparation of a Coating Liquid B-1 for a Hard Coat Layer)

To a mixed solvent of 673.3 g of isopropanol and 146.7 g of methyl isobutyl ketone 184.8 g of a UV-curable hard coat material (Z-7522, manufactured by JSR KK) was added. The mixture was stirred and then filtered through a polypropylene filter having a pore diameter of 1 μm to prepare a coating liquid B-1 for a hard coat layer.
(Preparation of a Coating Liquid A-1 for a Low Refractive Index Layer)

To 200 g of a thermocurable fluoropolymer (JN-7219 manufactured by JSR KK) was added 200 g of methyl isobutyl ketone, and the mixture was stirred and then filtered through a polypropylene filter having a pore diameter of 1 μm to prepare a coating liquid A-1 for a low refractive index layer.

Example 1-1

Monodisperse crosslinked acrylic particles having an average particle diameter of 5 μm were added in an amount of 0.2% by weight to the coating liquid A-1 for a hard coat layer, stirred and coated onto a triacetylcellulose film having a thickness of 80 μm (TAC-TD 80U, manufactured by Fuji Photo Film Co., Ltd.) by the aid of a bar coater. The coated film was dried at 120° C., irradiated with UV-rays at an irradiation dose of 300 mJ/cm² and an illuminance of 400 mW/cm² using a 160 W/cm air-cooled metal halide lamp (manufactured by Ai Graphics KK) to cure the coating layer to form a hard coat layer having a thickness of 1.4 μm, 2.1 μm, 2.6 μm, 2.9 μm, 3.3 μm or 4.7 μm. These hard coat layers were referred to arbitrarily as Samples 1, 2, 3, 4, 5 and 6 in the written order.

Example 1-2

The aforesaid coating liquid A-1 for a hard coat layer was coated onto a triacetylcellulose film having a thickness of 80 μm (TAC-TD 80U, manufactured by Fuji Photo Film Co., Ltd.) by the aid of a bar coater. The coated film was dried at 120° C., irradiated with UV-rays at an irradiation dose of 300 mJ/cm² and an illuminance of 400 mW/cm² using a 160 W/cm air-cooled metal halide lamp (manufactured by Ai Graphics KK) to cure the coating layer to form a hard coat layer having a thickness of 3 μm and referred to arbitrarily as Sample 7. In a similar manner, monodisperse crosslinked acrylic particles having an average particle diameter of 5 μm were added in an amount of 0.07%, 0.216%, 0.428%, 0.713% or 1.09% by weight to the coating liquid A-1 for a hard coat layer, and the mixture was stirred and coated onto the film. These hard coat layers were referred to arbitrarily as Samples 8–12 in the written order.

Example 1-3

In the same manner as described in Example 1-2, amorphous silica particles having an average particle diameter of 5 μm were added in an amount of 0.15%, 0.43%, 0.91%, 1.52% or 2.19% by weight to the coating liquid A-1 for a hard coat layer, and the mixture was stirred and then coated to the aforesaid film to form hard coat layers thereon. These hard coat layers were referred to as Samples 13~17.

Example 1-4

In the same manner as described in Example 1-2, the coating liquid B-1 for a hard coat layer was coated onto the aforesaid film by the aid of a bar coater, and the film was irradiated with UV-rays to cure the coating layer to form a hard coat layer having a thickness of 3 μm. $SiO_2$ was deposited on the hard coat layer by vapor deposition to form a low refractive index layer having a thickness of 0.094 μm. This was referred to as Sample 18. Likewise, monodisperse crosslinked acrylic particles having average particle diameters of 5 μm and 3 μm were added respectively in amounts of 0.027%, 0.054%, 0.107%, 0.214% and 0.428% by weight to the coating liquid B-1 for a hard coat layer and the mixtures were stirred and coated onto the aforesaid film to form hard coat layers thereon. The low refractive index layer was formed on each of the hard coat layer and referred to herein as Samples 19~23.

Example 1-5

A hard coat layer was formed in a manner similar to the Sample 21 of Example 1-4, and the coating liquid A-1 for a low refractive index layer was coated thereon by the aid of a bar coater, dried at 80° C. and then subjected to thermal crosslinking at 120° C. for 10 minutes to form a low refractive index layer having a thickness of 0.096 μm. This layer was referred to as Sample 24.

(Evaluation of Matted Film)

As for the resultant films, the following items were evaluated:

(1) Roughness on Surface and an Average Interval of Particles

Measured three items at a longitudinal magnification of 10000, cut-off 0.25 and measured length 2.5 using a measuring instrument for a shape of surface SE-03C (manufactured by Kosaka Kenkyusho KK).

(2) Light Transmittance and Haze

Light transmittance and haze of the resultant films were measured by the aid of a haze meter Model 1001DP (manufactured by Nihon Denshoku Kogyo KK).

(3) Evaluation of Matt Property

As an index of the matt property, a slide glass was placed on the matted layer of the film manufactured and a weight of 1 kg was overlaid on the glass to determine the state of non-uniformity in ring shape due to contact according to the following evaluations:

Non-uniformity is utterly not recognized ○

Slight non-uniformity is recognized in small areas but permissible Δ

Generation of non-uniformity in all areas X (4) Evaluation of Non-uniformity in Brightness The resultant film was stuck on the backside of a liquid crystal cell, and mounted to a monitor. On display of white color, non-uniformity in brightness was visually evaluated as follows:

Non-uniformity is utterly not recognized ○

Slight non-uniformity is recognized but permissible Δ

Generation of non-uniformity in all areas X

Table 1-1 shows a result of the evaluation of samples in Example 1-1. It is understood that the matt property and non-uniformity in brightness are improved as the roughness on surface becomes larger. On the contrary, the transmittance is decreased as the roughness on surface becomes larger, thus showing significant decrease at the roughness on surface Ra being 0.5 and Rz being 3.8. Accordingly, the roughness on surface Ra is preferably 0.1~0.3 μm and more preferably 0.15~0.25 μm. On the other hand, Rz is preferably 1~3 μm and more preferably 1.3~2.3 μm.

TABLE 1-1

| Sample | Roughness on surface Ra[μm] | Roughness on surface Rz[μm] | Matt property | Non-uniformity in brightness | Transmittance [%] |
|---|---|---|---|---|---|
| 1 | 0.5 | 3.8 | ○ | ○ | 84 |
| 2 | 0.3 | 3 | ○ | ○ | 91 |
| 3 | 0.24 | 2.3 | ○ | ○ | 92 |
| 4 | 0.15 | 1.3 | ○ | ○ | 92 |
| 5 | 0.1 | 1 | Δ | Δ | 93 |
| 6 | 0.04 | 0.6 | x | x | 93 |

Table 1-2 shows results of Examples 1-2 and 1-3 Table 1-3 shows a result of Example 1-4. It is understood that the matt property and non-uniformity are improved as an average interval of particles, i.e. the number of mountains per length PC becomes larger. On the contrary, the transmittance is decreased as the number of mountains becomes larger. The number of mountains PC is preferably 20~200/cm and more preferably 50~120/cm. As a result of allowing the coating liquid used in Examples 1-2 and 1-3 to stand stationarily for 3 hours, precipitation of particles was observed in the case of the coating liquid used in Example 1-3 where silica was used, thus showing lack of stability on coating. It is also observed that haze was significant and the transmittance was somewhat decreased. In view of these results, it is noted that selection of organic materials is more preferable than inorganic materials for the particles. Comparing the results of Example 1-2 with those of Example 1-4, it is understood that the transmittance is higher in the result of Examples 1-4, so that a low refractive index layer is preferably provided.

TABLE 1-2

| Sample | Number of mountains PC [mountains /cm] | Matt property | Non-uniformity in brightness | Transmittance [%] |
|---|---|---|---|---|
| 7 | 1 | x | x | 94 |
| 8 | 21 | Δ | Δ | 93 |
| 9 | 62 | ○ | ○ | 92 |
| 10 | 118 | ○ | ○ | 92 |
| 11 | 203 | ○ | ○ | 91 |
| 12 | 299 | ○ | ○ | 83 |
| 13 | 19 | Δ | Δ | 92 |
| 14 | 58 | ○ | ○ | 91 |
| 15 | 102 | ○ | ○ | 91 |
| 16 | 197 | ○ | ○ | 90 |
| 17 | 278 | ○ | ○ | 79 |

TABLE 1-3

| Sample | Number of mountains PC [mountains /cm] | Matt property | Non-uniformity in brightness | Transmittance [%] |
| --- | --- | --- | --- | --- |
| 18 | 2 | x | x | 94 |
| 19 | 23 | Δ | Δ | 94 |
| 20 | 47 | ○ | ○ | 93 |
| 21 | 85 | ○ | ○ | 93 |
| 22 | 164 | ○ | ○ | 92 |
| 23 | 318 | ○ | ○ | 85 |

Table 1-4 shows a result of Example 1-5. As compared with Sample 21 in Table 1-3, the result shows a higher transmittance. In Sample 21, finger print and stain on the surface of the sample could not be wiped out completely, whereas the case of Sample 24 such stain could easily be wiped out. Thus, the use of a fluorine containing compound for a low refractive index layer is preferable.

TABLE 1-4

| Sample | Haze [%] | Roughness on surface Ra [μm] | Roughness on surface Rz [μm] | Matt property | Non-uniformity in brightness | Transmittance [%] |
| --- | --- | --- | --- | --- | --- | --- |
| 24 | 3 | 0.19 | 1.7 | ○ | ○ | 94 |

A polarizing plate having a high transmittance and matt property was then prepared by using the film of Example 1-5. Two polarizing plates respectively comprising the films disposed on both sides of a liquid crystal cell were used, and the polarizing plate on the side of backlight out of the two polarizing plates was disposed facing the matted layer to the backlight side to prepare a liquid crystal display device. In this display device, the brightness was increased by 2% in display of white as compared with the device prepared without using this film. In this liquid crystal display device, deterioration of the display quality caused by non-uniformity was not observed in either of the cases wherein the device was maintained at normal temperature environment and at 60° C. of heated environment.

Example 2

Silica fine particles, a coating liquid for a hard coat layer and a coating liquid for a low refractive index layer used in Example 2 and Comparative Example 2 were prepared as follows:
(Surface Treatment of Silica Fine Particles)

In a 500 ml three-necked flask made of glass equipped with a stirring device, a thermometer and a reflux condenser was placed 200 g of a dispersion of 30% by weight of silica particles of an average particle diameter of 15 nm in isopropanol. To this dispersion was added 0.15 g of 2N hydrochloric acid, and the mixture was heated up to 60° C. in a stream of nitrogen. To the mixture was then added 7.5 g of 3-methacryloyloxypropyl trimethoxysilane (I-6) and the mixture was stirred for 4 hours to subject the silica fine particles to surface treatment.
(Preparation of a Coating Liquid A-2 for a Hard Coat Layer)

To 280.6 g of 32.5% by weight of a dispersion of the surface-treated silica fine particles having an average particle diameter in isopropanol were added 92.6 g of methanol, 123.5 g of methyl isobutyl ketone and 366.4 g of isopropanol. To this liquid mixture was further added and dissolved therein 136.8 g of a mixture of dipentaerythritol pentacrylate and dipentaerythritol hexaacrylate (trade name: DPHA (trade name, manufactured by Nihon Kayaku KK)). To the resultant solution was added 6.84 g of a photopolymerization initiator (Irgacure 907 (trade name, manufactured by Ciba-Geigy Co.)). The mixture was stirred to dissolve the initiator and filtered through a filter made of polypropylene having a pore diameter of 1 am to prepare a coating liquid A-2 for a hard coat layer.
(Preparation of a Coating Liquid B-2 for a Hard Coat Layer)

The aforesaid coating liquid A-2 for a hard coat layer was incorporated with 1.14 g of a crosslinked acrylic particles having an average particle diameter of 5.0 μand a variation coefficient of 0.1 (MX-500H (trade name, manufactured by Soken Kagaku KK)), and the mixture was stirred to prepare a coating liquid B-2 for a hard coat layer.
(Preparation of a Coating Liquid C-2 for a Hard Coat Layer)

The aforesaid coating liquid B-2 for a hard coat layer was further incorporated with 1.14 g of a crosslinked acrylic particles having an average particle diameter of 3.0 μm and a variation coefficient of 0.1 (MX-300H (trade name, manufactured by Soken Kagaku KK)) and the mixture was stirred to prepare a coating liquid C-2 for a hard coat layer.
(Preparation of a Coating Liquid D-2 for a Hard Coat Layer)

The aforesaid coating liquid A-2 for a hard coat layer was incorporated with 1.14 g of an amorphous silica particles having an average particle diameter of 5.2 μm and a variation coefficient of 0.5 (Sairishia 450 (trade name, manufactured by Fuji Silicia Kagaku KK)) and the mixture was stirred to prepare a coating liquid D-2 for a hard coat layer.
(Preparation of a Coating Liquid E-2 for a Hard Coat Layer)

To 304.0 g of a 30% by weight dispersion of silica fine particles having an average particle diameter of 15 nm in isopropanol were added 92.6 g of methanol, 123.5 g of methyl isobutyl ketone and 343.0 g of isopropanol. To this liquid mixture was further added and dissolved therein 136.8 g of DPHA. To the resultant solution was added 6.84 g of a photopolymerization initiator (Irgacure 907). The mixture was stirred to dissolve the initiator and filtered through a filter made of polypropylene having a pore diameter of 1 μm. Further, 1.14 g of a crosslinked acrylic particles having an average particle diameter of 5.0 μm and a variation coefficient of 0.1 (MX-500H) was added to the filtrate and stirred to prepare a coating liquid E-2 for a hard coat layer.
(Preparation of a Coating Liquid F-2 for a Hard Coat Layer)

In a solvent mixture of 92.6 g of methanol, 123.5 g of methyl isobutyl ketone and 555.8 g of isopropanol was dissolved 228.0 g of DPHA. To the resultant solution was added 6.84 g of a photopolymerization initiator (Irgacure 907). The mixture was stirred to dissolve the initiator and then filtered through a filter made of polypropylene having a pore diameter of 1 μm to prepare a coating liquid F-2 for a hard coat layer.
(Preparation of a Coating Liquid G-2 for a Hard Coat Layer)

The aforesaid coating liquid F-2 for a hard coat layer was incorporated with 1.14 g of a crosslinked acrylic particles having an average particle diameter of 5.0 μm and a variation coefficient of 0.1 (MX-500H) and the mixture was stirred to prepare a coating liquid G-2 for a hard coat layer.
(Preparation of a Coating Liquid A-2 for a Low Refractive Index Layer)

To 200 g of a thermocurable fluoropolymer (trade name: JN-7225, manufactured by JSR KK) was added 200 g of methyl isobutyl ketone, and the mixture was filtered through a filter made of polypropylene having a pore diameter of 1 μm to prepare a coating liquid A-2 for a low refractive index layer.

Example 2-1

The aforesaid coating liquid B-2 for a hard coat layer was coated onto a triacetylcellulose film having a thickness of 80 μm (TAC-TD 80U, manufactured by Fuji Photo Film Co., Ltd.) with the aid of a bar coater. The coated film was dried at 120° C., and irradiated with UV-rays at an irradiation dose of 300 mJ/cm$^2$ and an illuminance of 400 mW/cm$^2$ using a 160 W/cm air-cooled metal halide lamp (manufactured by Ai Graphics KK) to cure the coating layer to form a hard coat layer having a thickness of 3 μm.

Example 2-2

In the same manner as described in Example 2-1, a hard coat layer was prepared except that the coating liquid C-2 for a hard coat layer was used in place of the coating liquid B-2 used in Example 2-1.

Comparative Example 2-1

In the same manner as described in Example 2-1, a hard coat layer was prepared except that the coating liquid A-2 for a hard coat layer was used in place of the coating liquid B-2 used in Example 2-1.

Comparative Example 2-2

In the same manner as described in Example 2-1, a hard coat layer was prepared except that the coating liquid D-2 for a hard coat layer was used in place of the coating liquid B-2 used in Example 2-1.

Comparative Example 2-3

In the same manner as described in Example 2-1, a hard coat layer was prepared except that the coating liquid G-2 for a hard coat layer was used in place of the coating liquid B-2 used in Example 2-1.

Comparative Example 2-4

In the same manner as described in Example 2-1, a hard coat layer was prepared except that the coating liquid E-2 for a hard coat layer was used in place of the coating liquid B-2 used in Example 2-1.

Comparative Example 2-5

In the same manner as described in Example 2-1, a hard coat layer was prepared except that the coating liquid F-2 for a hard coat layer was used in place of the coating liquid B-2 used in Example 2-1.

Example 2-3

The aforesaid coating liquid A-2 for a low refractive index layer was coated onto the hard coat layer prepared in Example 2-1 by the aid of a bar coater, dried at 80° C. and subjected to thermal crosslinking at 120° C. for 10 minutes to form a low refractive index layer having a thickness of 100 nm.

Example 2-4

The aforesaid coating liquid A-2 for a low refractive index layer was coated onto the hard coat layer prepared in Example 2-2 by the aid of a bar coater, dried at 80° C. and subjected to thermal crosslinking at 120° C. for 10 minutes to form a low refractive index layer having a thickness of 100 nm.

Comparative Example 2-6

The aforesaid coating liquid A-2 for a low refractive index layer was coated onto the hard coat layer prepared in Comparative Example 2-1 by the aid of a bar coater, dried at 80° C. and subjected to thermal crosslinking at 120° C. for 10 minutes to form a low refractive index layer having a thickness of 100 nm.

Comparative Example 2-7

The aforesaid coating liquid A-2 for a low refractive index layer was coated onto the hard coat layer prepared in Comparative Example 2-2 by the aid of a bar coater, dried at 80° C. and subjected to thermal crosslinking at 120° C. for 10 minutes to form a low refractive index layer having a thickness of 100 nm.

Comparative Example 2-8

The aforesaid coating liquid A-2 for a low refractive index layer was coated onto the hard coat layer prepared in Comparative Example 2-3 by the aid of a bar coater, dried at 80° C. and subjected to thermal crosslinking at 120° C. for 10 minutes to form a low refractive index layer having a thickness of 100 nm.

Comparative Example 2-9

The aforesaid coating liquid A-2 for a low refractive index layer was coated onto the hard coat layer prepared in Comparative Example 2-4 by the aid of a bar coater, dried at 80° C. and subjected to thermal crosslinking at 120° C. for 10 minutes to form a low refractive index layer having a thickness of 100 nm.

Comparative Example 2-10

The aforesaid coating liquid A-2 for a low refractive index layer was coated onto the hard coat layer prepared in Comparative Example 2-5 by the aid of a bar coater, dried at 80° C. and subjected to thermal crosslinking at 120° C. for 10 minutes to form a low refractive index layer having a thickness of 100 nm.

(Evaluation of the Matted Film)

As for the resultant films, the following items were evaluated:

(1) Light Transmittance and Haze

As in the case of Example 1, light transmittance and haze of the resultant films were measured by the aid of a haze meter Model 100lDP (manufactured by Nihon Denshoku Kogyo KK).

(2) Evaluation of Pencil Hardness

As an index of scratch-resistance, evaluation of pencil hardness disclosed in JIS K 5400 was carried out. After adjusting moisture of the resultant film at 25° C. and a relative humidity of 60% RH for 2 hours, a scratch test was carried out according to JIS S 6006 by using test pencils of H, 2H, and 3H under a load of 1 kg.

The pencil hardness was evaluated in accordance with the following standard:

In the evaluation of n=5, no scratch was detected ◯

In the evaluation of n=5, 1 or 2 scratch marks Δ

In the evaluation of n=5, at least 3 scratch marks X (3) Curl Value

The resultant film was cut out in a size of 35 mm×3 mm, put between the plates of reading scale for F-type curl value, and read out the curl value after being moistened at 25° C., a relative humidity of 60% RH for 30 minutes.

(4) Measurement of Dynamic Friction Coefficient

As an index of a surface-sliding property, the measurement of dynamic friction coefficient was carried out. The resultant film was adjusted in humidity at 25° C. and a relative humidity of 60% RH for 2 hours and then measured by a HEIDON-14 dynamic friction tester using a stainless steel ball having a diameter of 5 mmφ under a load of 100 g at a velocity of 60 cm/min whereby the measured value was used as a dynamic friction coefficient.

(5) Evaluation of Matt Property

In the same manner as in the case of Example 1, as an index of the matt property, a 4 cm×5 cm slide glass was placed on the matted layer of the film manufactured and a weight of 1 kg was overlaid on the glass to determine the state of non-uniformity in ring shape due to contact according to the following evaluations:

Non-uniformity is utterly not recognized ○
Slight non-uniformity is recognized in small areas Δ
Generation of non-uniformity in all areas X Table 2-1 shows results of Examples 2-1 and 2-2 and Comparative Examples 2-1~2-5. In Example 2-1 where the surface-treated silica fine particles and the matt particles were incorporated into the hard coat layer, all of the items such as the scratch-resistance (pencil hardness), the curl value and the matt property are improved as compared with Comparative Examples 2-1~2-5. In Example 2-2 where 2 kinds of matt particles are used for adjusting haze, the light transmittance is somewhat decreased due to the increase of haze but the pencil hardness, the curl value and the matt property show equivalent excellent values as in Example 2-1. In view of Example 2-2, it is confirmed that it is possible to adjust the optical performance while maintaining the matt property and the like. In Comparative Example 2-1 where matt particles were not used, the matt property is not recognized. In Comparative Example 2-2 where amorphous silica particles were used as matt particles, the matt property is low and the light transmittance is somewhat decreased. In Comparative Example 2-3 where the surface-treated silica fine particles were not used, the pencil hardness is inferior and the curl value is larger so that deformation of film easily tends to take place. In Comparative Example 2-4 where untreated silica fine particles were used in place of the surface-treated silica fine particles, the curl value is equivalent to the cases of Examples 2-1 and 2-2 but the pencil hardness is inferior. In Comparative Example 2-5 where neither of the surface-treated fine silica particles and matt particles was used, all of the items of the pencil hardness, the curl value and the matt property are inferior.

TABLE 2-1

| | Haze [%] | Light transmittance [%] | Pencil hardness H | 2H | 3H | F-type curl [-] | Dynamic friction coefficient [-] | Matt property |
|---|---|---|---|---|---|---|---|---|
| Example 2-1 | 1.4 | 92.3 | ○ | ○ | ○ | 0.6 | 0.54 | ○ |
| Example 2-2 | 3.7 | 91.9 | ○ | ○ | ○ | 0.5 | 0.53 | ○ |
| Comparative Example 2-1 | 0.1 | 92.4 | ○ | ○ | ○ | 0.6 | 0.56 | X |
| Comparative Example 2-2 | 1.5 | 92.0 | ○ | ○ | ○ | 0.6 | 0.55 | Δ |

TABLE 2-1-continued

| | Haze [%] | Light transmittance [%] | Pencil hardness H | 2H | 3H | F-type curl [-] | Dynamic friction coefficient [-] | Matt property |
|---|---|---|---|---|---|---|---|---|
| Comparative Example 2-3 | 1.2 | 92.4 | ○ | Δ | X | 1.2 | 0.55 | ○ |
| Comparative Example 2-4 | 1.4 | 92.3 | ○ | Δ | X | 0 7 | 0.55 | ○ |
| Comparative Example 2-5 | 0.0 | 92.2 | ○ | Δ | X | 2.1 | 0.57 | X |

Next, Table 2-2 shows results of Examples 2-3 and 2-4 and Comparative Examples 2-6~2-10. In Examples 2-3 and 2-4 where the low refractive index layer was coated, the pencil hardness, the curl value and the matt property are equivalent but the light transmittance is increased approximately by 2%, as compared with Examples 2-1 and 2-2. In Comparative Examples 2-6~2-10, the light transmittance is increased nearly by 2% as compared with Comparative Examples 2-1~2-5, respectively. It has been confirmed that a film having a high transmittance is prepared by coating of a low refractive index layer. In Comparative Examples 2-6~2-10, the matt property was inferior in Comparative Examples 2-6 and 2-7, the pencil hardness and the curl value were inferior in Comparative Example 2-8, the curl value was inferior in Comparative Example 2-9 and all of the pencil hardness, the curl value and the matt property were inferior in Comparative Example 2-10, as in the case of Comparative Examples 2-1~2-5.

TABLE 2-2

| | Haze [%] | Light transmittance [%] | Pencil hardness H | 2H | 3H | F-type curl [-] | Dynamic friction coefficient [-] | Matt property |
|---|---|---|---|---|---|---|---|---|
| Example 2-3 | 2.0 | 94.1 | ○ | ○ | ○ | 0.6 | 0.09 | ○ |
| Example 2-4 | 3.4 | 93.8 | ○ | ○ | ○ | 0.6 | 0.09 | ○ |
| Comparative Example 2-6 | 0.1 | 94.0 | ○ | ○ | ○ | 0.6 | 0.11 | X |
| Comparative Example 2-7 | 1.3 | 93.5 | ○ | ○ | ○ | 0.7 | 0.10 | Δ |
| Comparative Example 2-8 | 1.2 | 94.1 | ○ | ○ | X | 1.3 | 0.10 | ○ |
| Comparative Example 2-9 | 1.1 | 94.2 | ○ | ○ | X | 0.7 | 0.09 | ○ |
| Comparative Example 2-10 | 0.0 | 94.0 | ○ | ○ | X | 2.2 | 0.10 | X |

In view of the results of Tables 2-1 and 2-2, it is confirmed that the surface-treated silica fine particles and the matt particles are respectively effective for the scratch-resistance, the curl value and the matt property.

Next, polarizing plates having a high transmittance and matt property were prepared using the films shown in Examples 2-3 and 2-4. This film was used as a polarizing plate on the side of backlight out of the two polarizing plates disposed on both sides of a liquid crystal cell while facing the matted layer to the backlight side to prepare a liquid crystal display device. In this display device, the brightness was increased by 2% in display of white as compared with the device prepared without using this film. In this liquid crystal display device, deterioration of the display quality caused by non-uniformity was not observed even after 7 days in either of the cases wherein the device was maintained at normal temperature environment and at 60° C. of heated environment. In case of using the films of Examples 2-1 and 2-2, deterioration of display quality was not observed but improvement in brightness was not achieved. In case of using the films of Comparative Examples 2-6 and 2-7, brightness was increased by 1~2% but deterioration of display quality due to non-uniformity was not suppressed. In case of using the films of Comparative Examples 2-8 and 2-9, the scratch-resistance is inferior so that it was necessary to take care of damaging on setting them up in a liquid crystal display device, and hence troublesome works were needed for manufacturing the device. In case of using the film of Comparative Example 2-10, brightness was increased by 1~2% but the film itself was deformed and display quality was not improved at all.

Example 3

A coating liquid for a hard coat layer, a coating liquid for a low refractive index layer, a coating liquid for an alignment layer and a coating liquid for an optical anisotropic layer used in Example 3 and Comparative Example 3 were prepared as follows:

(Preparation of a Coating Liquid A-3 for a Hard Coat Layer)

In a solvent mixture of 78.8 g of isopropanol, 157.2 g of methyl isobutyl ketone and 102.1 g of methanol was dissolved 256.5 g of a mixture of dipentaerythritol pentaacrylate and dipentaerythritol hexaacrylate (DPHA (trade name, manufactured by Nihon Kayaku KK)). To the resultant solution was added 5.4 g of a photopolymerization initiator (Irgacure 907 (trade name, manufactured by Ciba-Geigy Co.)). The mixture was stirred to dissolve the initiator and filtered through a filter made of polypropylene having a pore diameter of 1 μm and the filtrate was incorporated with 1.3 g of a crosslinked acrylic particles (MX-500H (trade name, manufactured by Soken Kagaku KK)) having an average particle diameter of 5.0 μm and then stirred to prepare a coating liquid A-3 for a hard coat layer.

(Preparation of a Coating Liquid B-3 for a Hard Coat Layer)

To a solvent mixture of 673.3 g of isopropanol and 146.7 g of methyl isobutyl ketone was added a UV-curable hard coat material (KZ-7874 (trade name, manufactured by JSR KK)). The mixture was stirred and filtered through a filter made of polypropylene having a pore diameter of 1 μm and the filtrate was incorporated with 1.3 g of crosslinked acrylic particles (MX-500H (trade name, manufactured by Soken Kagaku KK)) having an average particle diameter of 5.0 μm and 1.3 g of crosslinked acrylic particles (MX-300H (trade name, manufactured by Soken Kagaku KK)) having an average particle diameter of 3.0 μm to prepare a coating liquid B-3 for a hard coat layer.

(Preparation of a Coating Liquid C-3 for a Hard Coat Layer)

In a solvent mixture of 78.8 g of isopropanol, 157.2 g of methyl isobutyl ketone and 102.1 g of methanol was dissolved 256.5 g of a mixture of dipentaerythritol pentaacrylate and dipentaerythritol hexaacrylate (DPHA (trade name, manufactured by Nihon Kayaku KK)). To the resultant solution was added 5.4 g of a photopolymerization initiator (Irgacure 907 (trade name, manufactured by Ciba-Geigy Co.)). The mixture was stirred to dissolve the initiator and filtered through a filter made of polypropylene having a pore diameter of 1 μm to prepare a coating liquid C-3 for a hard coat layer.

(Preparation of a coating liquid D-3 for a hard coat layer)

In a solvent mixture of 78.8 g of isopropanol, 157.2 g of methyl isobutyl ketone and 102.1 g of methanol was dissolved 256.5 g of a mixture of dipentaerythritol pentaacrylate and dipentaerythritol hexaacrylate (DPHA (trade name, manufactured by Nihon Kayaku KK)). To the resultant solution was added 5.4 g of a photopolymerization initiator (Irgacure 907 (trade name, manufactured by Ciba-Geigy Co.)). The mixture was stirred to dissolve the initiator and filtered through a filter made of polypropylene having a pore diameter of 1 μm and the filtrate was incorporated with 10 g of amorphous silica particles (Mizukasil P-526 (trade name, manufactured by Mizusawa Kagaku KK)) having an average particle diameter of 3 μm, and then stirred and dispersed by high-speed disperser at 5000 rpm for 1 hour, and filtered through a filter made of polypropylene having a pore diameter of 30 μm, to prepare a coating liquid D-3 for a hard coat layer.

(Preparation of a Coating Liquid E-3 for a Hard Coat Layer)

In a solvent mixture of 78.8 g of isopropanol, 157.2 g of methyl isobutyl ketone and 102.1 g of methanol was dissolved 256.5 g of a mixture of dipentaerythritol pentaacrylate and dipentaerythritol hexaacrylate (DPHA (trade name, manufactured by Nihon Kayaku KK)). To the resultant solution was added 5.4 g of a photopolymerization initiator (Irgacure 907 (trade name, manufactured by Ciba-Geigy Co.)). The mixture was stirred to dissolve the initiator and filtered through a filter made of polypropylene having a pore diameter of 1 μm and the filtrate was incorporated with 20.0 g of silica particles (Siho-star KE-P150 (trade name, manufactured by Nihon Shokubai KK)) having an average particle diameter of 1.5 μm and then stirred to prepare a coating liquid E-3 for a hard coat layer.

(Preparation of a Coating Liquid A-3 for a Low Refractive Index Layer)

To 200 g of a thermocurable fluoropolymer (JN-7225 (trade name, manufactured by JSR KK)) was added 200 g of methyl isobutyl ketone. The mixture was stirred and filtered through a filter made of polypropylene having a pore diameter of 1 μm to prepare a coating liquid A-3 for a low refractive index layer.

(Preparation of a Coating Liquid B-3 for a Low Refractive Index Layer)

To 500 g of a thermocurable fluoropolymer (JN-7223 (trade name, manufactured by JSR KK)) was added 100 g of methyl isobutyl ketone. The mixture was stirred and filtered through a filter made of polypropylene having a pore diameter of 1 μm to prepare a coating liquid B-3 for a low refractive index layer.

(Preparation of a Coating Liquid for an Alignment Layer)

To 30 g of a linear alkyl-modified poly(vinyl alcohol) (MP-203 (trade name, manufactured by Kuraray Co.)) were added 130 g of water and 40 g of methanol. The mixture was stirred for dissolving the resin and then filtered through a filter made of polypropylene having a pore diameter of 30 μm to prepare a coating liquid for an alignment layer.

(Preparation of a Coating Liquid A-3 for an Optical Anisotropic Layer)

In 3.65 g of methyl ethyl ketone were dissolved 1.6 g of the aforesaid Compound No. TE-8 (R:8, m=4) as a liquid crystalline discotic compound, 0.4 g of phenoxydiethyleneglycol acrylate (M-101 (trade name, manufactured by Toa Gosei KK)), 0.05 g of cellulose acetate butyrate (CAB531-1 (trade name, manufactured by Eastman Chemical Inc.)) and 0.01 g of a photopolymerization initiator (Irgacure 907 (trade name, manufactured by Ciba-Geigy Co.)). The resultant solution was filtered through a filter made of polypropylene having a pore diameter of 1 μm to prepare a coating liquid A-3 for an optical anisotropic layer.

(Preparation of a Coating Liquid B-3 for an Optical Anisotropic Layer)

In 3.43 g of methyl ethyl ketone were dissolved 1.8 g of the aforesaid Compound No. TE-8 (R:8, m=4) as a liquid crystalline discotic compound, 0.2 g of ethylene glycol-modified trimethylolpropane triacrylate (V#360 (trade name, manufactured by Osaka Yukikagaku Kogyo KK)), 0.04 g of cellulose acetate butyrate (CAB531-1 (trade name, manufactured by Eastman Chemical Inc.)), 0.06 g of a photopolymerization initiator (Irgacure 907 (trade name, manufactured by Ciba-Geigy Co.)) and 0.02 g of a photosensitizer (Kayacure-DETX (trade name, manufactured by Nihon Kayaku KK)). The resultant solution was filtered through a filter made of polypropylene having a pore diameter of 1 μm to prepare a coating liquid B-3 for an optical anisotropic layer.

(Preparation of a Coating Liquid C-3 for an Optical Anisotropic Layer)

In 7.2 g of methyl ethyl ketone was dissolved 1.8 g of the aforesaid Compound No. TE-8 (R:3) and the solution was filtered through a filter made of polypropylene having a pore diameter of 1 μm to prepare a coating liquid C-3 for an optical anisotropic layer.

Example 3-1

(Preparation of a Film Having a High Transmittance and Matt Property)

The aforesaid coating liquid A-3 for a hard coat layer was coated onto a triacetylcellulose film (manufactured by Fuji Photo Film Co., Ltd.) having a thickness of 80 μm by the aid of a bar coater and the film was dried at 120° C. and then irradiated with UV-rays at an irradiation dose of 300 mJ/cm$^2$ and an illuminance of 400 mW/cm$^2$ using a 160 W/cm air-cooled metal halide lamp (manufactured by Ai Graphics KK) to cure the coated layer to form a hard coat layer having a thickness of 3 μm.

Next, the aforesaid coating liquid A-3 for a low refractive index layer was coated onto the hard coat layer by the aid of a bar coater, dried at 80° C. and heated at 120° C. for 10 minutes to effect thermal crosslinking thereby manufacturing a film having a high transmittance and matt property by forming a low refractive index layer having a thickness of 0.096 μm.

(Preparation of an Optical Compensative Film)

The aforesaid coating liquid for an alignment layer was coated onto a triacetylcellulose film having a sub-layer of a gelatin thin film (0.1 μm) (manufactured by Fuji Photo Film Co., Ltd.) having a thickness of 120 μm by the aid of a bar coater, dried at 60° C. and subjected to a rubbing treatment to form an alignment layer having a thickness of 0.5 μm on the film.

The thickness of the triacetyllcellulose film provided with the alignment layer was measured b y a micrometer and retardation from various directions was measured by way of an ellipso-meter (AEP-100 manufactured by Shimazu Seisakusho) to determine the aforesaid |nx−ny|×d and {(nx+ny)/2−nz}×d whereby |nx−ny|×d was 3 nm and {(nx+ny)/2−nz}×d was 60 nm. Namely, this triacetylcellulose film is approximately a negative uniaxial film and its light axis was nearly a direction to the normal line of the film.

The aforesaid coating liquid A-3 for an optical anisotropic layer was coated onto the alignment layer by the aid of a bar coater, dried at 120° C., then heated for further 3 minutes to effect aging of the liquid crystal thereby aligning the discotic compound, and irradiated with Uv-rays at an irradiation dose of 300 mJ/cm$^2$ and an illuminance of 400 mW/cm$^2$ using a 160 W/cm air-cooled metal halide lamp (manufactured by Ai Graphics KK) while maintaining the temperature at 120° C. to cure the coated layer thereby manufacturing an optical compensative film by forming an optical anisotropic layer having a thickness of 1.8 μm.

(Preparation of a Polarizing Plate)

The aforesaid film having a high transmittance and matt property and the optical compensative film were subjected to a saponifying treatment with an aqueous solution of 1.5N NaOH. A polarizing layer comprised of iodine-doped stretched poly(vinyl alcohol) was put between the film having a high transmittance and matt property and the optical compensative film on the side of triacetylcellulose surface and bonded to prepare a polarizing plate of Example 3-1.

Example 3-2

The aforesaid coating liquid B-3 for a hard coat layer was coated onto a triacetylcellulose film (manufactured by Fuji Photo Film Co., Ltd.) having a thickness of 80 μm by the aid of a bar coater and the film was dried at 120° C. and then irradiated with UV-rays at an irradiation dose of 300 mJ/cm$^2$ and an illuminance of 400 mW/cm$^2$ using a 160 W/cm air-cooled metal halide lamp (manufactured by Ai Graphics KK) to cure the coated layer to form a hard coat layer having a thickness of 3 μm.

Next, the aforesaid coating liquid A-3 for a low refractive index layer was coated onto the hard coat layer by the aid of a bar coater, dried at 80° C. and heated at 120° C. for 10 minutes to effect thermal crosslinking thereby manufacturing a film having a high transmittance and matt property by forming a low refractive index layer having a thickness of 0.096 μm.

In the same manner as described in Example 3-1 except that the above film having a high transmittance and matt property was used, a polarizing plate of Example 3-2 was prepared.

Example 3-3

The aforesaid coating liquid B-3 for an optical anisotropic layer was coated onto the alignment layer of Example 3-1 by the aid of a bar coater, dried at 120° C., then heated for further 3 minutes to effect aging of the liquid crystal thereby aligning the discotic compound and irradiated with UV-rays at an irradiation dose of 300 mJ/cm$^2$ and an illuminance of 400 mW/cm$^2$ using a 160 W/cm air-cooled metal halide lamp (manufactured by Ai Graphics KK) while maintaining the temperature at 120° C. to cure the coated layer thereby manufacturing an optical compensative film by forming an optical anisotropic layer having a thickness of 1.8 μm.

In the same manner as described in Example 3-1 except that the above optical compensative film was used, a polarizing plate of Example 3-3 was prepared.

Example 3-4

The film having a high transmittance and matt property as described in Example 3-1 and the triacetylcellulose surface of the optical compensative film were treated with a binder and bonded on both sides of a commercially available polarizing plate (manufactured by Sanritz Co.) using triacetylcellulose as a protecting film for a polarizing layer, thereby to prepare a polarizing plate of Example 3-4.

Comparative Example 3-1

The aforesaid coating liquid B-3 for a hard coat layer was coated onto a triacetylcellulose film (manufactured by Fuji Photo Film Co., Ltd.) having a thickness of 80 μm by the aid of a bar coater and the film was dried at 120° C. and then irradiated with UV-rays at an irradiation dose of 300 mJ/cm$^2$ and an illuminance of 400 mW/cm$^2$ using a 160 W/cm air-cooled metal halide lamp (manufactured by Ai Graphics KK) to cure the coated layer to form a hard coat layer having a thickness of 3 μm.

In the same manner as described in Example 3-1 except that this matted film was used in place of the film having a high transmittance and matt property, a polarizing plate of Comparative Example 3-1 was prepared.

Comparative Example 3-2

The aforesaid coating liquid B-3 for a hard coat layer was coated onto a triacetylcellulose film (manufactured by Fuji Photo Film Co., Ltd.) having a thickness of 80 μm by the aid of a bar coater and the film was dried at 120° C. and then irradiated with UV-rays at an irradiation dose of 300 mJ/cm$^2$ and an illuminance of 400 mW/cm$^2$ using a 160 W/cm air-cooled metal halide lamp (manufactured by Ai Graphics KK) to cure the coated layer to form a hard coat layer having a thickness of 3 μm. Next, the aforesaid coating liquid B-3 for a low refractive index layer was coated onto the hard coat layer by the aid of a bar coater, dried at 80° C. and heated at 120° C. for 10 minutes to effect thermal crosslinking thereby manufacturing a film having a high transmittance and matt property by forming a low refractive index layer having a thickness of 0.096 μm.

In the same manner as described in Example 3-1 except that the above film having matt property was used in place of the film having a high transmittance and matt property, a polarizing plate of Comparative Example 3-2 was prepared.

Comparative Example 3-3

The aforesaid coating liquid C-3 for a hard coat layer was coated onto a triacetylcellulose film (manufactured by Fuji Photo Film Co., Ltd.) having a thickness of 80 μm by the aid of a bar coater and the film was dried at 120° C. and then irradiated with UV-rays at an irradiation dose of 300 mJ/cm$^2$ and an illuminance of 400 mW/cm$^2$ using a 160 W/cm air-cooled metal halide lamp (manufactured by Ai Graphics KK) to cure the coated layer to form a hard coat layer having a thickness of 3 μm.

Next, the aforesaid coating liquid A-3 for a low refractive index layer was coated onto the hard coat layer by the aid of a bar coater, dried at 80° C. and heated at 120° C. for 10 minutes to effect thermal crosslinking thereby manufacturing a film having a high transmittance and matt property by forming a low refractive index layer having a thickness of 0.096 μm.

In the same manner as described in Example 3-1 except that the above film having a high transmittance and matt property was used, a polarizing plate of Comparative Example 3-3 was prepared.

Comparative Example 3-4

The aforesaid coating liquid D-3 for a hard coat layer was coated onto a triacetylcellulose film (manufactured by Fuji Photo Film Co., Ltd.) having a thickness of 80 μm by the aid of a bar coater and the film was dried at 120° C. and then irradiated with UV-rays at an irradiation dose of 300 mJ/cm$^2$ and an illuminance of 400 mW/cm$^2$ using a 160 W/cm air-cooled metal halide lamp (manufactured by Ai Graphics KK) to cure the coated layer to form a hard coat layer having a thickness of 3 μm.

Next, the aforesaid coating liquid A-3 for a low refractive index layer was coated onto the hard coat layer by the aid of a bar coater, dried at 80° C. and heated at 120° C. for 10 minutes to effect thermal crosslinking thereby manufacturing a film having a high transmittance and matt property by forming a low refractive index layer having a thickness of 0.096 μm.

In the same manner as described in Example 3-1 except that the above film having a high transmittance and matt property was used, a polarizing plate of Comparative Example 3-4 was prepared.

Comparative Example 3-5

The aforesaid coating liquid E-3 for a hard coat layer was coated onto a triacetylcellulose film (manufactured by Fuji Photo Film Co., Ltd.) having a thickness of 80 μm by the aid of a bar coater and the film was dried at 120° C. and then irradiated with UV-rays at an irradiation dose of 300 mJ/cm$^2$ and an illuminance of 400 mW/cm$^2$ using a 160 W/cm air-cooled metal halide lamp (manufactured by Ai Graphics KK) to cure the coated layer to form a hard coat layer having a thickness of 3 μm.

Next, the aforesaid coating liquid A-3 for a low refractive index layer was coated onto the hard coat layer by the aid of a bar coater, dried at 80° C. and heated at 120° C. for 10 minutes to effect thermal crosslinking thereby manufacturing a film having a high transmittance and matt property by forming a low refractive index layer having a thickness of 0.096 μm.

In the same manner as described in Example 3-1 except that the above film having a high transmittance and matt property was used, a polarizing plate of Comparative Example 3-5 was prepared.

Comparative Example 3-6

In the same manner as described in Example 3-2 except that a triacetylcellulose film (manufactured by Fuji Photo Film Co., Ltd.) having a thickness of 80 μm was used in place of the optical compensative film, a polarizing plate of Comparative Example 3-6 was prepared.

Comparative Example 3-7

The aforesaid coating liquid C-3 for an optical anisotropic layer was coated onto the alignment layer of Example 3-1 by the aid of a bar coater and the layer was dried at 180° C., then heated further for one minute to effect aging of the liquid crystal thereby aligning the discotic compound, cooled to room temperature to prepare an optical compensative film by forming an optical anisotropic layer having a thickness of 1.0 μm.

In the same manner as described in Example 3-2 except that the optical compensative film was used, a polarizing plate of Comparative Example 3-7 was prepared.

(Evaluation of the Film Having a High Transmittance and Matt Property)

As for the resultant films having a high transmittance and matt property, the following items were evaluated:

(1) Light Transmittance and Haze

In the same manner as in the case of Example 1, light transmittance and haze of the resultant films were measured by the aid of a haze meter Model 1001DP (manufactured by Nihon Denshoku Kogyo KK).

(2) Evaluation of Pencil Hardness

In the same manner as in the case of Example 2, evaluation of pencil hardness disclosed in JIS K 5400 was carried out, as an index of scratch-resistance. After adjusting moisture of the anti-refrection film at 25° C. and a relative humidity of 60% RH for 2 hours, a scratch test was carried out according to JIS S 6006 by using test pencils of H and 2H. Under a load of 1 kg:

In the evaluation of n=5, no scratch was detected ○

In the evaluation of n=5, 1 or 2 scratch marks Δ

In the evaluation of n=5, at least 3 scratch marks X (3) Measurement of Dynamic Friction Coefficient In the same manner as in the case of Example 2, the measurement of dynamic friction coefficient was carried out as an index of a surface-sliding property. The resultant film was adjusted in humidity at 25° C. and a relative humidity of 60% RH for 2 hours and then measured by a HEIDON-14 dynamic friction tester using a stainless steel ball having a diameter of 5 mmφ under a load of 100 g at a velocity of 60 cm/min whereby the measured value was used as a dynamic friction coefficient.

(4) Evaluation of Matt Property

In the same manner as in the case of Example 1, as an index of the matt property, a 4×5 cm slide glass was placed on the matted layer of the film manufactured and a weight of 1 kg was overlaid on the glass to determine the state of non-uniformity in ring shape due to contact according to the following evaluations:

Non-uniformity is utterly not recognized ○

Slight non-uniformity is recognized in small areas Δ

Generation of non-uniformity in all areas X (5) Evaluation of Scratch-preventing Property As an index of scratch-preventing property, the prepared film was bonded to a stainless steel panel having a size of 20×75 mm and a weight of 500 g so that the matting surface might become an external side thereof. This panel was placed on a polyethylene terephthalate film so as to face the matted surface downward and then the stainless steel panel was drawn at a rate of 20 mm/min. Scratch mark thus formed on the polyethylene terephthalate film was evaluated as follows:

No scratch was detected ○

Partial scratch was detected in the test area Δ

Scratch was detected wholly in the test area X (Evaluation of the Optical Compensative Film)

As for the resultant optical compensative film, the following items were evaluated:

(1) Haze

Haze of the resultant film was measured by the aid of haze meter Model 1001DP (manufactured by Nihon Denshoku Kogyo KK).

(2) Light Axis and Variation of Inclination Angle

In the optical compensative film, retardation from all the directions in perpendicular surface to the optical compensative film surface including the rubbing axis was measured by an ellipso-meter (AEP-100 manufactured by Shimazu Seisakusho KK). Further, retardation of only the support and the alignment layer of the film from which the optical anisotropic layer of the measured portion had been removed was likewise measured. By obtaining the optical characteristics of the optical anisotropic layer alone (dependency of measuring angle of retardation) from these two measured values, existence or non-existence of any light axis was investigated, assuming the direction of retardation being zero as light axis. Besides, inclination (variation of inclination angle) of the discotic compound to the surface of the support was calculated by fitting of the optical characteristics.

(3) Size of Domain

A size of domain formed in the optical anisotropic layer was measured by observation through a polarizing microscope.

Table 3-1 shows results of Examples and Comparative Examples.

TABLE 3-1

| | Film having a high transmittance and matt property | | | | | | Optical compensative film | | | |
| --- | --- | --- | --- | --- | --- | --- | --- | --- | --- | --- |
| | | Light | Pencil hardness | | Dynamic friction coefficient | Matt | Scratch-preventing | Haze | Light axis | Variation of inclination angle | Domain |
| | Haze [%] | transmittance [%] | H | 2H | [-] | property | property | [%] | | [°] | [nm] |
| Example 3-1 | 1.2 | 94.2 | ○ | ○ | 0.10 | ○ | ○ | 1.0 | not present | 20–50 | mono* |
| Example 3-2 | 3.4 | 94.0 | ○ | ○ | 0.10 | ○ | ○ | 1.0 | not present | 20–50 | mono |
| Example 3-3 | 1.2 | 94.2 | ○ | ○ | 0 10 | ○ | ○ | 0.3 | not present | 20–70 | mono |
| Example 3-4 | 1.2 | 94.2 | ○ | ○ | 0.10 | ○ | ○ | 1.0 | not present | 20–50 | mono |
| Comparative Example 3-1 | 3.8 | 92.1 | ○ | ○ | 0.53 | ○ | Δ | 1.0 | not present | 20–50 | mono |
| Comparative Example 3-2 | 3.4 | 94.2 | ○ | X | 0.29 | ○ | Δ | 1.0 | not present | 20–50 | mono |
| Comparative Example 3-3 | 0.0 | 94.0 | ○ | ○ | 0.10 | X | ○ | 1.0 | not present | 20–50 | mono |
| Comparative Example 3-4 | 5.8 | 93.5 | ○ | ○ | 0.10 | ○ | X | 1.0 | not present | 20–50 | mono |
| Comparative Example 3-5 | 1.8 | 94.0 | ○ | ○ | 0.10 | Δ | X | 1.0 | not present | 20–50 | mono |
| Comparative Example 3-6 | 3.4 | 94.0 | ○ | ○ | 0.10 | ○ | ○ | — | — | — | — |
| Comparative Example 3-7 | 3.4 | 94.0 | ○ | ○ | 0.10 | ○ | ○ | 7.9 | present | — | 10 |

*mono = monodomain

Next, a liquid crystal display device as shown in FIG. 6(a) was prepared using the films of Examples 3-1~3-4 and Comparative Examples 3-1~3-7. The same optical compensative film as used in each Example was used for an optical compensative film of the front side polarizing plate.

As Example 3-5, a commercially available anti-glare and anti-reflection polarizing plate formed by vapor deposition (manufactured by Sanritz Co.) was used as a protective layer for a front side polarizing plate, a binder was used on the opposite surface of the anti-glare and anti-reflection layer to bond the optical compensative film of Example 3-1, and the polarizing plate of Example 3-2 was used as a backside polarizing plate to prepare a liquid crystal display device as shown in FIG. 6(b).

A liquid crystal cell comprising a nematic liquid crystal at a twisted angle of 90° was put between the plates with a gap size of 4.5 μm.

Figure 9:
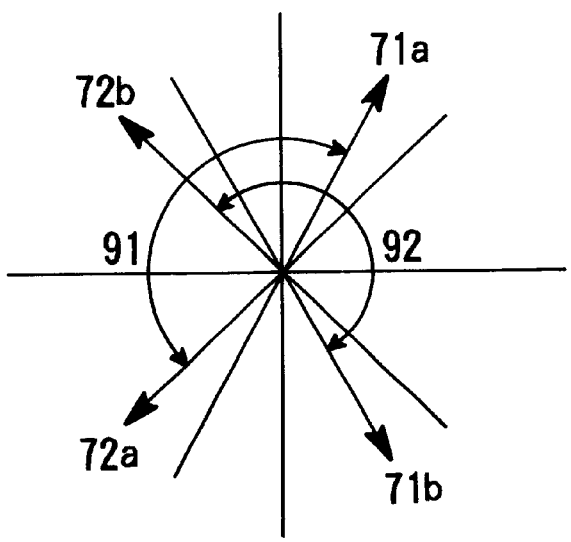
FIG. 9 is a drawing showing a representative construction of FIG. 7 viewing from the direction of the normal line of the film.

As shown in FIG. 9, the construction is such that an angle 91 of a rubbing direction 71a of the down side optical compensative film with a rubbing direction 72a of the down side substrate is 180° while an angle 92 of a rubbing direction 71b of the up side optical compensative film with a rubbing direction 72b of the up side substrate is 180°. These elements are disposed as shown in FIG. 7.

(Evaluation of the Liquid Crystal Display Device)

As for the resultant liquid crystal display device, the following items were evaluated:

(1) On-axis Contrast Ratio

A 55 Hz square wave voltage 0-5 V was applied to the resultant TN-LCD and the contrast ratio in the normal to the front surface was measured by the aid of a spectrometer (LCD-5000 manufactured by Ohtsuka Densi KK).

(2) Viewing Angle

A 55 Hz square wave voltage 0-5 V was applied to the resultant TN-LCD and the contrast in inclined directions of up/down and left/right was measured by the aid of a spectrometer (LCD-5000 manufactured by Ohtsuka Densi KK). The viewing angle was defined as angle range of the contrast ratio being at least 10.

(3) Visibility in Room

The blackness in black display of the resultant TN-LCD in room was visually evaluated in accordance with the following items:

⊚: Blackness is very good irrespective of illumination in room

○: Blackness is good though influenced by illumination in room

Δ: Blackness becomes somewhat bad in oblique directions

X: Blackness is bad

Table 3-2 shows results of Examples and Comparative Examples.

TABLE 3-2

| | On-axis contrast ratio | Viewing angle [°] up/down | Viewing angle [°] left/right | Visibility in room |
|---|---|---|---|---|
| Example 3-1 | at least 100 | 130 | 125 | ○ |
| Example 3-2 | at least 100 | 130 | 125 | ○ |
| Example 3-3 | at least 100 | 130 | 130 | ○ |
| Example 3-4 | at least 100 | 130 | 125 | ○ |
| Example 3-5 | at least 100 | 130 | 125 | ○ |
| Comparative Example 3-1 | at least 100 | 130 | 125 | ○ |
| Comparative Example 3-2 | at least 100 | 130 | 125 | ○ |
| Comparative Example 3-3 | at least 100 | 130 | 125 | ○ |
| Comparative Example 3-4 | 80 | 105 | 90 | Δ |
| Comparative Example 3-5 | at least 100 | 123 | 115 | ○ |
| Comparative Example 3-6 | at least 100 | 60 | 95 | Δ |
| Comparative Example 3-7 | 60 | 40 | 65 | x |

Next, a color liquid crystal display device was prepared by peeling off a polarizing plate of TFT liquid crystal color television 6E-C3 (trade name, manufactured by Sharp Corp.) and using instead the polarizing plates of Examples 3-1, 3-3, 3-4 and 3-5 and Comparative Examples 3-6 and 3-7.

(Evaluation of the Color Liquid Crystal Display Device)

As for the resultant liquid crystal display device, the following items were evaluated:

(1) Viewing Angle

The resultant color liquid crystal display device was used for its white display and black display and the contrast in inclined directions up/down and left/right was measured by the aid of a spectrometer (LCD-5000 manufactured by Ohtsuka Densi KK). The viewing angle was defined as an angle range of the contrast ratio being at least 10.

Table 3-3 shows results of Examples and Comparative Examples.

TABLE 3-3

| | Viewing angle [°] up/down | Viewing angle [°] left/right |
|---|---|---|
| Example 3-1 | 123 | 115 |
| Example 3-3 | 130 | 120 |
| Example 3-4 | 123 | 115 |
| Example 3-5 | 123 | 115 |
| Comparative Example 3-6 | 50 | 70 |
| Comparative Example 3-7 | 30 | 55 |

Having described our invention as related to the present embodiments, it is our intention that the invention not be limited by any of the details of the description, unless otherwise specified, but rather be construed broadly within its spirit and scope as set out in the accompanying claims.

What we claim is:

1. A liquid crystal display device comprising an optical film having a matt property, wherein the optical film having a matt property is utilizable as an optical film on a backlight side of a liquid crystal cell in the liquid crystal display device, and wherein the optical film comprises a hard coat layer on a transparent support, the hard coat layer containing a crosslinked polymeric binder and transparent fine particles, and the surface roughness Ra being 0.1 to 0.3 μm and Rz being 1 to 3 μm.

2. A liquid crystal display device comprising a polarizing plate having a matt property used as a polarized plate on the side of backlight out of the two polarizing plates disposed on both sides of a liquid crystal cell, and the polarizing plate having a matt property being arranged in such manner that a matted layer is faced to the backlight side, wherein the polarizing plate having a matt property comprises an optical film having a matt property used for at least one of the two protective films of a polarizing layer thereof, and the matted layer disposed at the opposite side of the polarizing layer, and wherein the optical film having a matt property is utilizable as an optical film on a backlight side of the liquid crystal cell in the liquid crystal display device, and wherein the optical film comprises a hard coat layer on a transparent support, the hard coat layer containing a crosslinked polymeric binder and transparent fine particles, and the surface roughness Ra being 0.1 to 0.3 μm and Rz being to 3 μm.

3. A liquid crystal display device comprising a polarizing plate used as a polarizing plate on the side of backlight out of the two polarizing plates disposed on both sides of a liquid crystal cell, the polarizing plate being arranged in such manner that a matted layer is faced to the backlight side, wherein the polarizing plate comprises a polarizing layer interposed between 2 transparent supports, an optical compensative layer containing an optical anisotropic layer on the surface of one of the transparent supports opposite to the polarizing layer, and the matted layer on the surface of the other transparent support opposite to the polarizing layer, the optical anisotropic layer comprised of a compound of a discotic structure unit and having a negative birefringence, a disk surface of the discotic structure unit being inclined to the surface of the transparent support, and an angle of the disk surface of the discotic structure unit with the surface of the transparent support being changed in the direction of depth of the optical anisotropic layer.

4. A color liquid crystal display device comprising a pair of substrates having transparent electrodes, pixel electrodes, and a color filter, a liquid crystal cell sealed between the substrates and comprised of a twisted nematic liquid crystal, a pair of optical compensative sheets provided on both sides of the liquid crystal cell and a pair of polarizing plates provided respectively on the optical compensative sheets, the polarizing plates being used as the optical compensative sheet on the backlight side of the liquid crystal cell and the polarizing plate, the optical anisotropic layer of the polarizing plate being disposed toward the liquid crystal cell side, the optical compensative sheet comprising an optical anisotropic layer having a negative birefringence and comprised of a compound having a discotic structure unit being disposed on the display side of the liquid crystal cell, a disk surface of the discotic structure unit being inclined to the surface of a transparent support, and an angle of the disk surface of the discotic structure unit with the transparent support surface being changed in the direction of depth of the optical anisotropic layer, wherein each of the polarizing plates comprise a polarizing layer interposed between 2 transparent supports, an optical compensative layer containing an optical anisotropic layer on the surface of one of the transparent supports opposite to the polarizing layer, and a matted layer on the surface of the other transparent support opposite to the polarizing layer, the optical anisotropic layer comprised of a compound of a discotic structure unit and having a negative birefringence, a disk surface of the discotic structure unit being inclined to the surface of the transparent support, and an angle of the disk surface of the discotic structure unit with the surface of the transparent support being changed in the direction of depth of the optical anisotropic layer.

5. The color liquid crystal display device as claimed in claim 4, wherein a anti-reflection layer is formed on the top surface of the display side of the display side polarizing plate.

6. The color liquid crystal display device as claimed in claim 4, wherein a anti-glare layer is formed on the top surface of the display side of the display side polarizing plate.

7. The color liquid crystal display device as claimed in claim 4, wherein a anti-reflection and anti-glare layer is formed on the top surface of the display side of the display side polarizing plate.

8. A liquid crystal display device comprising an optical film having a matt property, wherein the optical film having a matt property comprises a hard coat layer on a transparent support, the hard coat layer containing inorganic fine particles having been treated on the surface thereof with a silane-coupling agent, a crosslinked polymeric binder, and monodisperse transparent fine particles having an average particle diameter greater than the thickness of the hard coat layer and a particle diameter distribution of 0.2 or less in terms of a variation coefficient.

9. A liquid crystal display device comprising an optical film having a matt property, wherein the optical film having a matt property is utilizable as an optical film on a backlight side of a liquid crystal cell in a liquid crystal display device, and wherein the optical film comprises a hard coat layer on a transparent support, the hard coat layer containing inorganic fine particles having been treated on the surface thereof with a silane-coupling agent, a crosslinked polymeric binder, and monodisperse transparent fine particles having an average particle diameter greater than the thickness of the hard coat layer and a particle diameter distribution of 0.2 or less in terms of a variation coefficient, and the surface roughness Ra being 0.1 to 0.3 μm and Rz being 1 to 3 μm.

10. A liquid crystal display device comprising a film having a high transmittance and a matt property, wherein the film is utilizable as an optical film on a backlight side of a liquid crystal cell in a liquid crystal display device, and wherein the film comprises a transparent support, a hard coat layer and a low refractive index layer having a refractive index lower than that of the transparent support, the hard coat layer and the low refractive index layer being overlaid on the transparent support in the written order, the hard coat layer containing a crosslinked polymeric binder and transparent fine particles, and the surface roughness Ra being 0.1 to 0.3 μm and Rz being 1 to 3 μm.

11. A liquid crystal display device comprising a film having a high transmittance and a matt property, wherein the film is utilizable as an optical film, and wherein the film comprises a transparent support, a hard coat layer and a low refractive index layer having a refractive index lower than that of the transparent support, the hard coat layer and the low refractive index layer being overlaid on the transparent support in the written order, the hard coat layer containing inorganic fine particles having been treated on the surface thereof with a silane-coupling agent, a crosslinked polymeric binder, and monodisperse transparent fine particles having an average particle diameter greater than the thickness of the hard coat layer and a particle diameter distribution of 0.2 or less in terms of a variation coefficient.

12. A liquid crystal display device comprising a film having a high transmittance and a matt property, wherein the film is utilizable as an optical film on a backlight side of a liquid crystal cell in a liquid crystal display device, and wherein the film comprises a transparent support, a hard coat layer and a low refractive index layer having a refractive index lower than that of the transparent support overlaid in the written order, the hard coat layer containing inorganic fine particles having been treated on the surface thereof with a silane-coupling agent, a crosslinked polymeric binder, and monodisperse transparent fine particles having an average particle diameter greater than the thickness of the hard coat layer and a particle diameter distribution of 0.2 or less in terms of a variation coefficient, and the surface roughness Ra being 0.1 to 0.3 μm and Rz being 1 to 3 μm.

13. A liquid crystal display device comprising a polarizing plate having a high transmittance and a matt property used as a polarized plate on the side of backlight out of the two polarizing plates disposed on both sides of a liquid crystal cell, and the polarizing plate having a high transmittance and a matt property being arranged in such manner that a matted layer is faced to the backlight side, wherein the polarizing plate having a high transmittance and a matt property comprises a film having a high transmittance and a matt property used for at least one of the two protective films of a polarizing layer thereof and the matted layer disposed at the opposite side of the polarizing layer, and wherein the film having a high transmittance and a matt property is utilizable as an optical film on a backlight side of the liquid crystal cell in the liquid crystal display device, and wherein the film comprises a transparent support, a hard coat layer and a low refractive index layer having a refractive index lower than that of the transparent support, the hard coat layer and the low refractive index layer being overlaid on the transparent support in the written order, the hard coat layer containing a crosslinked polymeric binder and transparent fine particles, and the surface roughness Ra being 0.1 to 0.3 μm and Rz being 1 to 3 μm.

14. A liquid crystal display device comprising a polarizing plate having a matt property used as a polarized plate on the side of backlight out of the two polarizing plates disposed on both sides of a liquid crystal cell, and the polarizing plate having a matt property being arranged in such manner that a matted layer is faced to the backlight side, wherein the polarizing plate having a matt property comprises an optical film having a matt property used for at least one of the two protecting films of a polarizing layer thereof and the matted layer disposed at the opposite side of the polarizing layer, and wherein the optical film having a matt property comprises a hard coat layer on a transparent support, the hard coat layer containing inorganic fine particles having been treated on the surface thereof with a silane-coupling agent, a crosslinked polymeric binder, and monodisperse transparent fine particles having an average particle diameter greater than the thickness of the hard coat layer and a particle diameter distribution of 0.2 or less in terms of a variation coefficient.

15. A liquid crystal display device comprising a polarizing plate having a high transmittance and a matt property used as a polarized plate on the side of backlight out of the two polarizing plates disposed on both sides of a liquid crystal cell, and the polarizing plate having a high transmittance and a matt property being arranged in such manner that a matted layer is faced to the backlight side, wherein the polarizing plate having a high transmittance and a matt property comprises a film having a high transmittance and a matt property used for at least one of the two protective films of a polarizing layer thereof and the matted layer disposed at the opposite side of the polarizing layer, and wherein the film having a high transmittance and a matt property is utilizable as an optical film, and wherein the film comprises a transparent support, a hard coat layer and a low refractive index layer having a refractive index lower than that of the transparent support, the hard coat layer and the low refractive index layer being overlaid on the transparent support in the written order, the hard coat layer containing inorganic fine particles having been treated on the surface thereof with a silane-coupling agent, a crosslinked polymeric binder, and monodisperse transparent fine particles having an average particle diameter greater than the thickness of the hard coat layer and a particle diameter distribution of 0.2 or less in terms of a variation coefficient.

* * * * *

UNITED STATES PATENT AND TRADEMARK OFFICE
CERTIFICATE OF CORRECTION

PATENT NO.    : 6,559,915 B1
DATED         : May 6, 2003
INVENTOR(S)   : Ichiro Amimori et al.

It is certified that error appears in the above-identified patent and that said Letters Patent is hereby corrected as shown below:

<u>Title page,</u>
Item [30], should read:
-- Jul. 19, 1999 (JP) ............................... 11-205351
   Sep. 29, 1999 (JP) ............................... 11-277033
   Sep. 30, 1999 (JP) ............................... 11-315746 --

Signed and Sealed this

Twenty-third Day of September, 2003

JAMES E. ROGAN
*Director of the United States Patent and Trademark Office*